(12) United States Patent
Wu et al.

(10) Patent No.: US 11,486,539 B2
(45) Date of Patent: Nov. 1, 2022

(54) SUSPENSION MOUNTING MECHANISM

(71) Applicant: Wistron NeWeb Corp., Hsinchu (TW)

(72) Inventors: Yu-Shuo Wu, Hsinchu (TW); Szu-Cheng Pao, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 17/341,890

(22) Filed: Jun. 8, 2021

(65) Prior Publication Data
US 2022/0042645 A1 Feb. 10, 2022

(30) Foreign Application Priority Data

Aug. 10, 2020 (TW) .................................. 109127000

(51) Int. Cl.
*F16M 13/02* (2006.01)
*E04B 9/00* (2006.01)

(52) U.S. Cl.
CPC ........... *F16M 13/027* (2013.01); *E04B 9/006* (2013.01)

(58) Field of Classification Search
CPC ........ F16M 13/027; E04B 9/006; H02B 1/052
See application file for complete search history.

(56) References Cited

U.S. PATENT DOCUMENTS

| | | | | |
|---|---|---|---|---|
| 3,018,080 A * | 1/1962 | Loudon | ................... | E04B 9/006 248/228.4 |
| 3,589,660 A * | 6/1971 | Dunckel | ................. | F21V 21/02 52/39 |
| 4,067,529 A * | 1/1978 | Milcoy | ................... | H02B 1/052 248/222.12 |
| 4,921,445 A * | 5/1990 | Herbert | ................... | H02B 1/052 439/716 |
| 5,598,322 A * | 1/1997 | Von Arx | ................... | H02B 1/26 361/810 |
| 5,803,772 A * | 9/1998 | Muller | ................... | H04Q 1/142 439/922 |
| 5,904,592 A * | 5/1999 | Baran | ..................... | H02B 1/052 361/627 |

(Continued)

FOREIGN PATENT DOCUMENTS

| | | |
|---|---|---|
| CN | 104728226 A | 6/2015 |
| TW | M482607 U | 7/2014 |

*Primary Examiner* — Eret C McNichols
(74) *Attorney, Agent, or Firm* — McClure, Qualey & Rodack, LLP

(57) ABSTRACT

A suspension mounting mechanism is provided. The suspension mounting mechanism is adapted to be mounted on a first ceiling structure. The suspension mounting mechanism includes a suspension bracket, a first holding hook, a second holding hook, a first stopping unit, a second stopping unit, and a locking unit. The first holding hook and the second holding hook are affixed to the suspension bracket. The first stopping unit is moveably disposed on the suspension bracket. The second stopping unit is moveably disposed on the suspension bracket. In a first state of assembly, the first ceiling structure presses and moves the first and second stopping units. In a first mounting state, the first holding hook and the first stopping unit abut one side of the first ceiling structure, and the second holding hook and the second stopping unit abut the other side of the first ceiling structure.

13 Claims, 24 Drawing Sheets

(56) References Cited

U.S. PATENT DOCUMENTS

| | | | | |
|---|---|---|---|---|
| 6,120,000 | A * | 9/2000 | Aeschbach | H02B 1/052 248/220.21 |
| 6,371,435 | B1 * | 4/2002 | Landis | H02B 1/052 439/716 |
| 6,563,697 | B1 * | 5/2003 | Simbeck | H02B 1/052 403/325 |
| 6,563,710 | B1 * | 5/2003 | Okuda | H05K 7/20918 361/600 |
| 6,935,903 | B2 * | 8/2005 | Gaidosch | H02B 1/052 439/94 |
| 7,059,898 | B2 * | 6/2006 | Barile | H02B 1/052 439/532 |
| 7,073,971 | B2 * | 7/2006 | Schurr | H05K 7/1474 439/94 |
| 7,374,453 | B1 * | 5/2008 | Allcock | E01B 9/38 439/716 |
| 7,522,428 | B2 * | 4/2009 | Nguyen | H02B 1/052 361/801 |
| 7,674,129 | B1 * | 3/2010 | Liu | H02B 1/052 439/716 |
| 7,758,368 | B2 * | 7/2010 | Schelonka | H02B 1/052 439/325 |
| 7,952,859 | B2 * | 5/2011 | Peng | H02B 1/052 361/679.02 |
| 7,980,891 | B2 * | 7/2011 | Molnar | H01R 9/2608 439/532 |
| 8,003,899 | B2 * | 8/2011 | WenLong | H02B 1/044 361/752 |
| 8,062,061 | B2 * | 11/2011 | Lim | H02B 1/052 439/716 |
| 8,066,239 | B2 * | 11/2011 | Molnar | H02B 1/052 361/732 |
| 8,226,433 | B1 * | 7/2012 | Correll | H01R 9/2608 439/532 |
| 8,651,442 | B2 * | 2/2014 | Takaya | H02B 1/052 248/228.7 |
| 9,303,811 | B1 * | 4/2016 | Lutz, Jr. | H05K 7/1474 |
| 9,331,404 | B2 * | 5/2016 | Devanand | H01R 9/2608 |
| 9,337,637 | B2 * | 5/2016 | Neumeier | H02B 1/0526 |
| 9,374,924 | B2 * | 6/2016 | Boretti | H05K 7/1401 |
| 9,545,027 | B2 * | 1/2017 | Chiang | H01R 25/142 |
| 9,955,597 | B1 * | 4/2018 | Wu | F16M 13/027 |
| 10,161,565 | B2 * | 12/2018 | Wu | F16F 1/12 |
| 10,734,093 | B1 * | 8/2020 | Bala | H05K 5/0204 |
| 11,326,735 | B1 * | 5/2022 | Rosenthal | E04B 9/006 |
| 2005/0006053 | A1 * | 1/2005 | Apfelbacher | H02B 1/052 165/80.2 |
| 2008/0299820 | A1 * | 12/2008 | Schelonka | H01R 9/2608 439/532 |
| 2010/0128448 | A1 * | 5/2010 | WenLong | H02B 1/052 361/747 |
| 2010/0255713 | A1 * | 10/2010 | Peng | H02B 1/052 439/532 |
| 2010/0314522 | A1 * | 12/2010 | Molnar | H02B 1/052 248/346.06 |
| 2012/0138759 | A1 * | 6/2012 | Takaya | H02B 1/052 248/225.21 |
| 2012/0298821 | A1 * | 11/2012 | Hofbauer | H01R 9/2608 248/231.41 |
| 2013/0214109 | A1 * | 8/2013 | Yu | H02B 1/052 248/298.1 |
| 2014/0139976 | A1 * | 5/2014 | Santoni | F16B 1/00 361/605 |
| 2014/0226287 | A1 * | 8/2014 | V | H02B 1/052 361/747 |
| 2015/0181745 | A1 | 6/2015 | Hand et al. | |
| 2016/0327764 | A1 * | 11/2016 | Shi | F16B 2/12 |
| 2020/0240573 | A1 | 7/2020 | Fischer | |

* cited by examiner

SUSPENSION MOUNTING MECHANISM

CROSS REFERENCE TO RELATED APPLICATIONS

This Application claims priority of Taiwan Patent Application No. 109127000, filed on Aug. 10, 2020, the entirety of which is incorporated by reference herein.

BACKGROUND OF THE INVENTION

Field of the Invention

The present invention relates to a suspension mounting mechanism, and in particular to a suspension mounting mechanism for fastening an electronic device to a ceiling structure.

Description of the Related Art

Wireless routers and similar electronic devices are commonly suspended on a ceiling via a suspension mounting mechanism. In particular, they are often suspended on a metal supporting structure in the ceiling. The metal supporting structure can be T-shaped beam or another type of metal supporting structure. There are many different types of metal supporting structures, however, and a single conventional suspension mounting mechanism cannot be attached to multiple types of metal supporting structures simultaneously, making it difficult to mount the electronic device (for example, a wireless router) to the ceiling.

Additionally, a conventional suspension mounting mechanism may easily drop from the ceiling structure, and the electronic device may be damaged. Therefore, a reliable and easy-to-assemble suspension mounting mechanism is required.

BRIEF SUMMARY OF THE INVENTION

Embodiments of the invention are provided to address the aforementioned difficulty.

In one embodiment, a suspension mounting mechanism is provided. The suspension mounting mechanism is adapted to be mounted on a first ceiling structure. The suspension mounting mechanism includes a suspension bracket, a first holding hook, a second holding hook, a first stopping unit, a second stopping unit, and a locking unit. The first holding hook is affixed to the suspension bracket. The second holding hook is affixed to the suspension bracket. The first stopping unit is moveably disposed on the suspension bracket. The second stopping unit is moveably disposed on the suspension bracket, wherein in a first state of assembly, the first ceiling structure presses and moves the first and second stopping units, and in a first mounting state, the first holding hook and the first stopping unit abut one side of the first ceiling structure, and the second holding hook and the second stopping unit abut another side of the first ceiling structure. In a locked state, the locking unit restricts the movement of the first stopping unit relative to the suspension bracket, and in an unlocked state, the restriction of the locking unit toward the first stopping unit is removed.

In one embodiment, the suspension mounting mechanism is adapted to be mounted on a second ceiling structure, the first stopping unit comprises a first elastic sheet and a second elastic sheet, the second stopping unit comprises a third elastic sheet and a fourth elastic sheet, in the first mounting state, the first holding hook and the first elastic sheet abut one side of the first ceiling structure, and the second holding hook and the third elastic sheet abut the other side of the first ceiling structure, and in a second state of assembly, the second ceiling structure presses and moves the first stopping unit and the second stopping unit, and in a second mounting state, the first holding hook and the second elastic sheet abut one side of the second ceiling structure, the second holding hook and the fourth elastic sheet abut the other side of the second ceiling structure, and the bottom surface of the second ceiling structure presses the first elastic sheet and the third elastic sheet at the same time, wherein the first ceiling structure has a first structural width, the second ceiling structure has a second structural width, and the second structure width is wider than the first structural width.

In one embodiment, the locking unit comprises a locking block. The locking block can be moved between a first block position and a second block position. In a locked state, the locking block is in the first block position, and it corresponds to the first stopping unit to restrict the first stopping unit from moving relative to the suspension bracket. In an unlocked state, the locking block has moved to the second block position, removing the restriction of the first stopping unit.

The suspension mounting mechanism of the embodiment of the invention can be selectively connected to two ceiling structures of different sizes. The suspension mounting mechanism of the embodiment of the invention has a simpler structure and a lower cost, and it can easily be attached to a ceiling structure. Additionally, the suspension mounting mechanism of the embodiment of the invention has a locking unit that prevents the suspension mounting mechanism from being unexpectedly separated from the ceiling structure.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
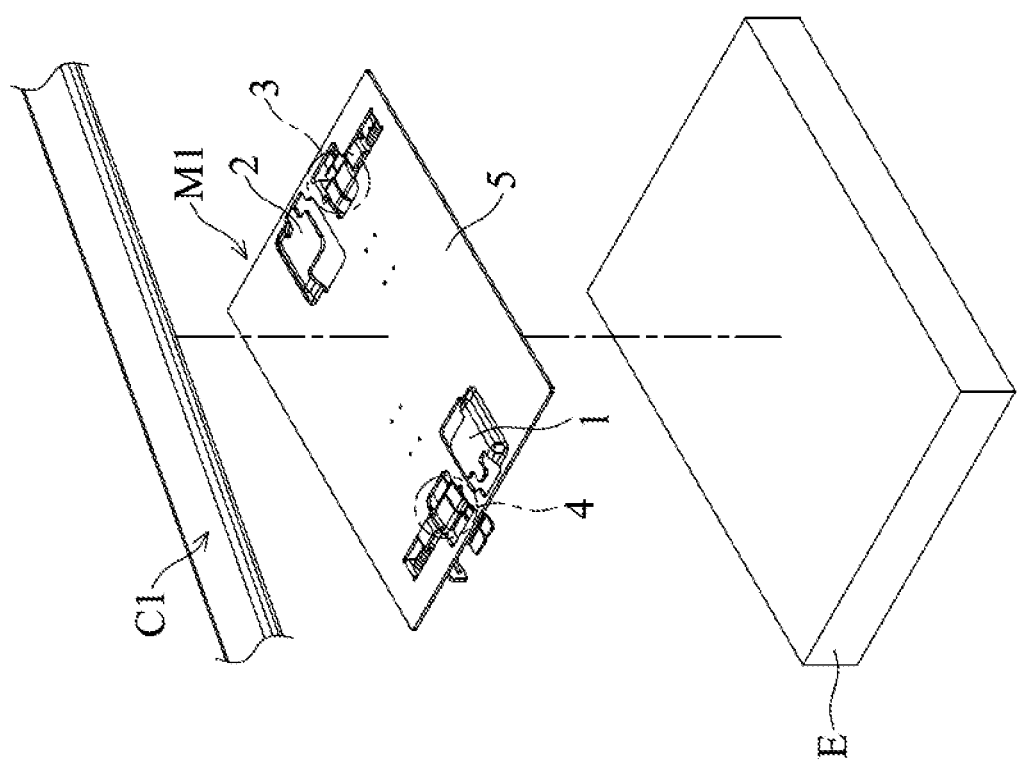
FIG. 1 shows a suspension mounting mechanism of a first embodiment of the invention.
Figure 2:
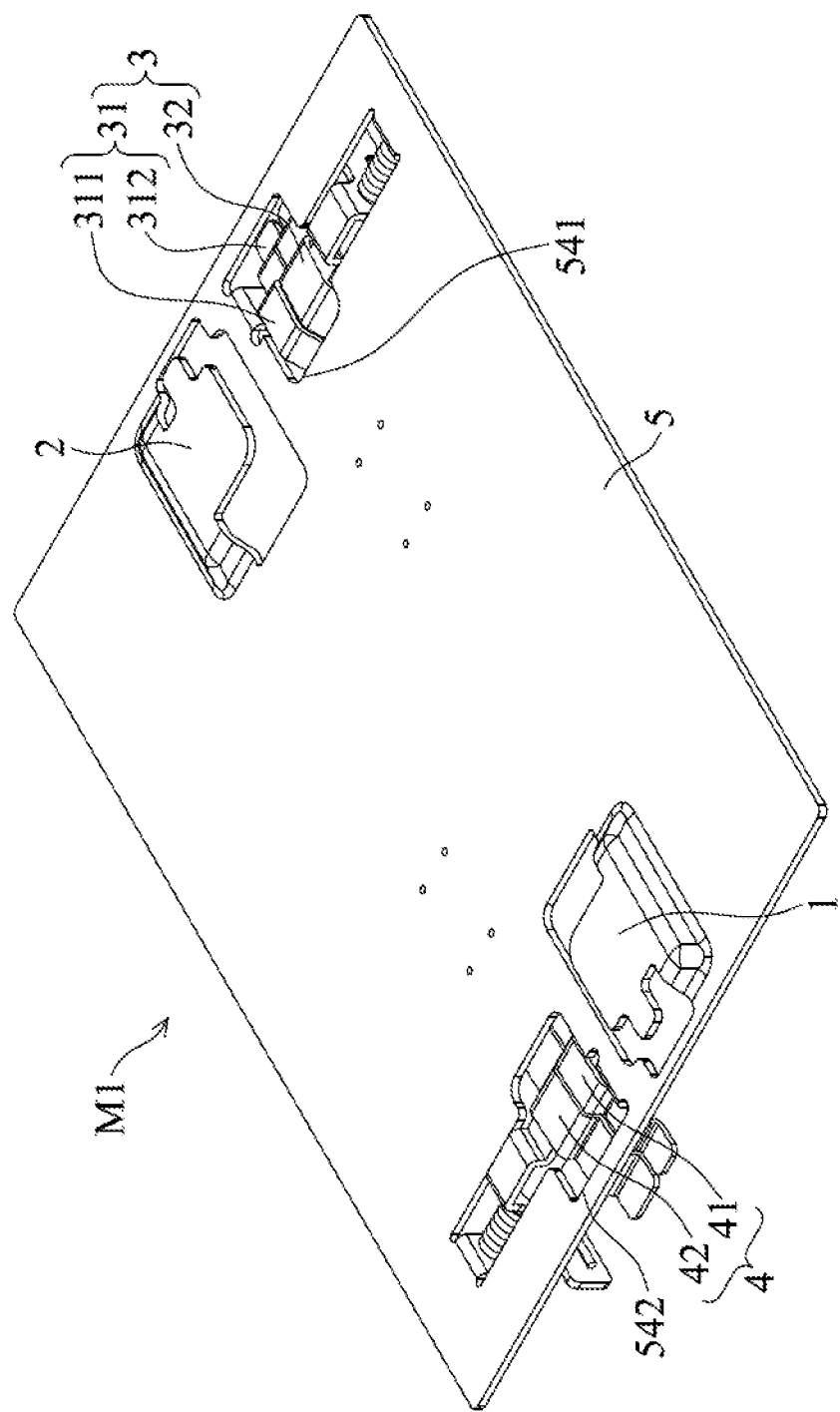
FIG. 2 is a perspective view of the suspension mounting mechanism of the first embodiment of the invention.

FIG. 1 shows a suspension mounting mechanism of a first embodiment of the invention. With reference to FIG. 1, the suspension mounting mechanism M1 of the first embodiment of the invention is adapted to mount an electronic device E on a first ceiling structure C1. FIG. 2 is a perspective view of the suspension mounting mechanism of the first embodiment of the invention. With reference to FIGS. 1 and 2, the suspension mounting mechanism M1 includes a suspension bracket 5, a first holding hook 1, a second holding hook 2, a first stopping unit 3 and a second stopping unit 4. The suspension bracket 5 is connected to the electronic device. The first holding hook 1 is affixed to the suspension bracket 5. The second holding hook 2 is affixed to the suspension bracket 5. The first stopping unit 3 is moveably disposed on the suspension bracket 5. The second stopping unit 4 is moveably disposed on the suspension bracket 5. In FIG. 1, the electronic device E is presented in schematic view.

Figure 3A:
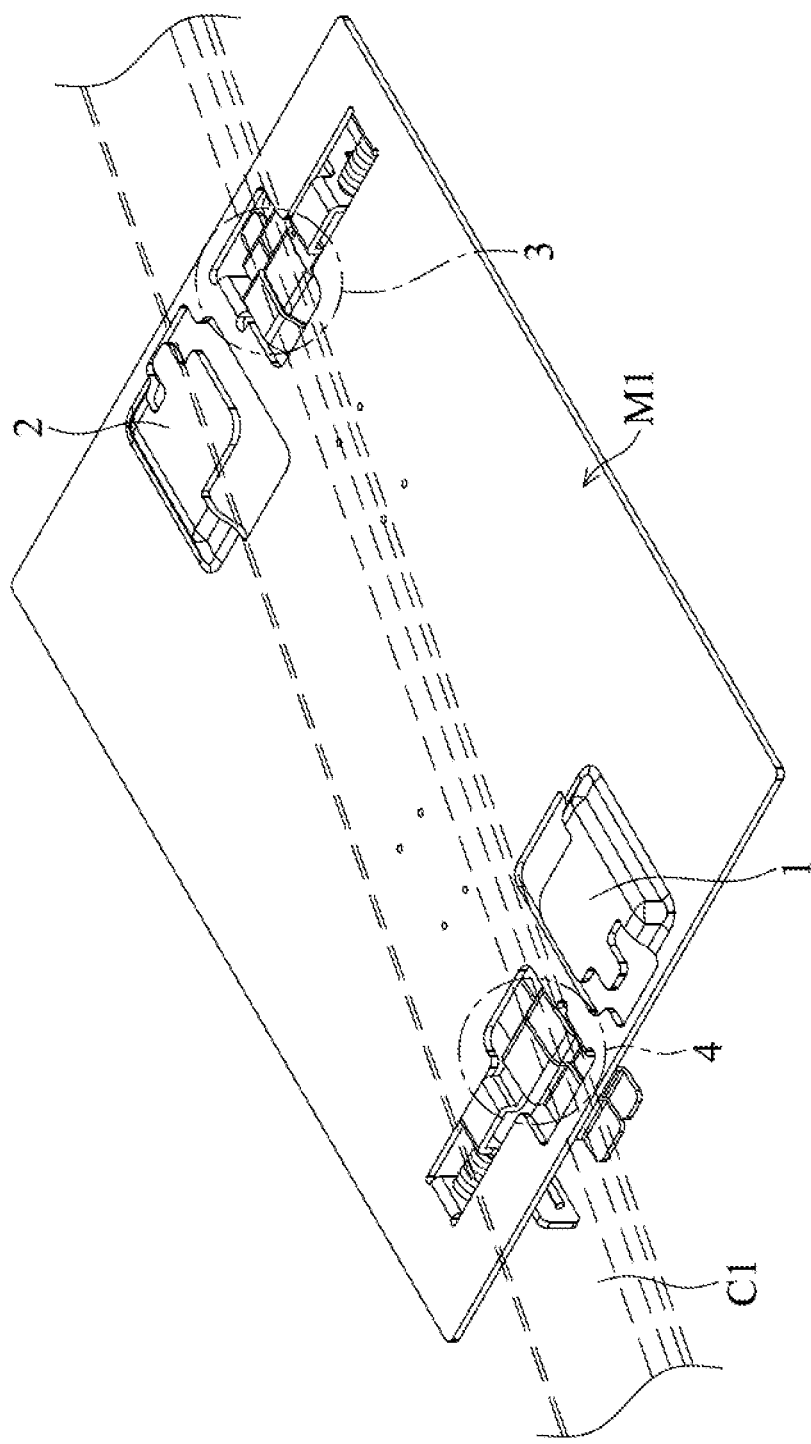
FIG. 3A shows a first state of assembly of the suspension mounting mechanism of the first embodiment of the invention.
Figure 3B:
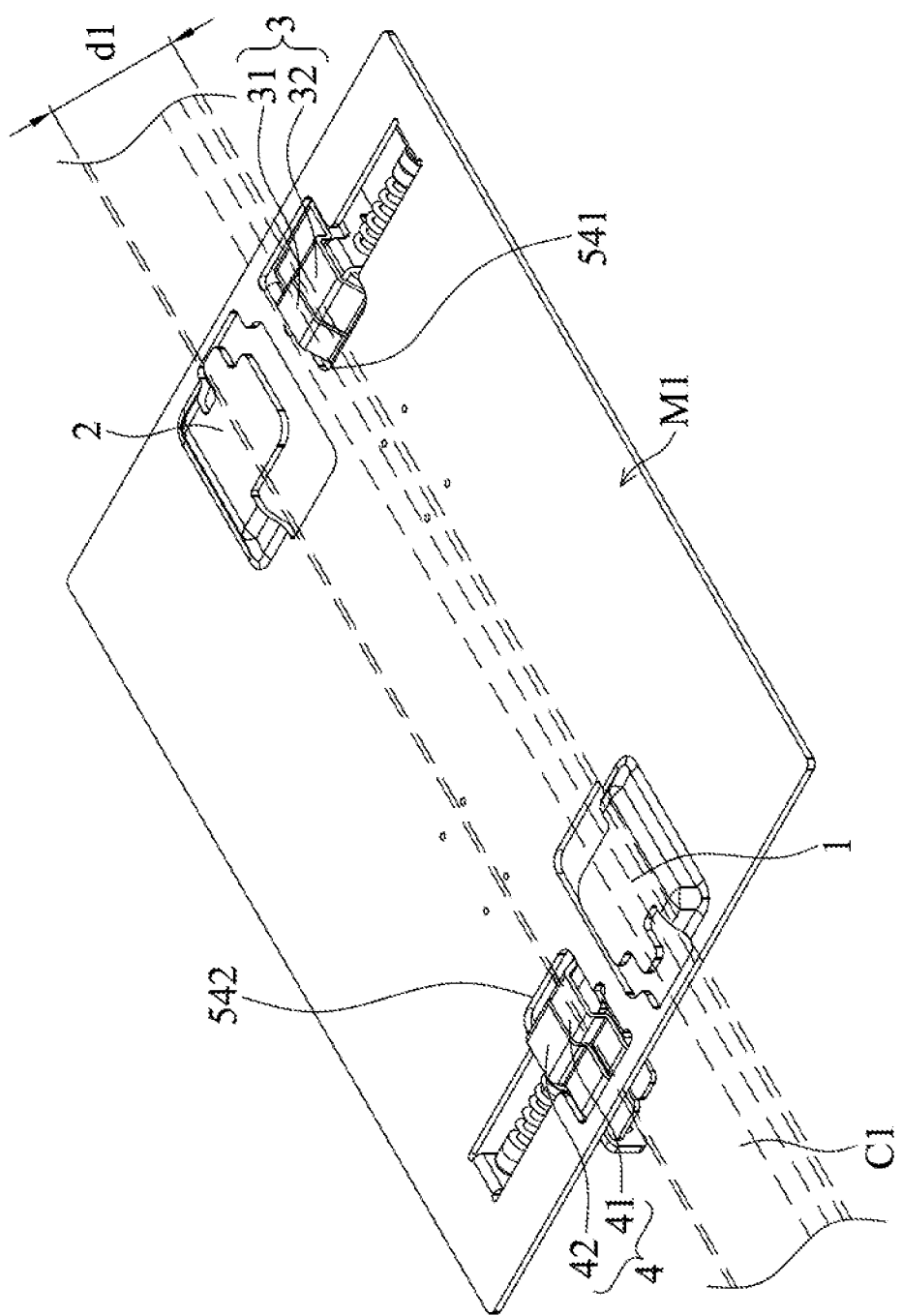
FIG. 3B shows a first mounting state of the suspension mounting mechanism of the first embodiment of the invention.

FIG. 3A shows a first state of assembly of the suspension mounting mechanism of the first embodiment of the invention. FIG. 3B shows a first mounting state of the suspension mounting mechanism of the first embodiment of the invention. With reference to FIGS. 3A and 3B, in the first state of assembly (FIG. 3A), the first ceiling structure C1 presses and moves the first stopping unit 3 and the second stopping unit 4. In the first mounting state (FIG. 3B), the first holding hook 1 and the first stopping unit 3 abut one side of the first ceiling structure C1, and the second holding hook 2 and the second stopping unit 4 abut the other side (the opposite side) of the first ceiling structure C1. Therefore, the suspension mounting mechanism M1 is firmly connected to the first ceiling structure C1.

Figure 4A:
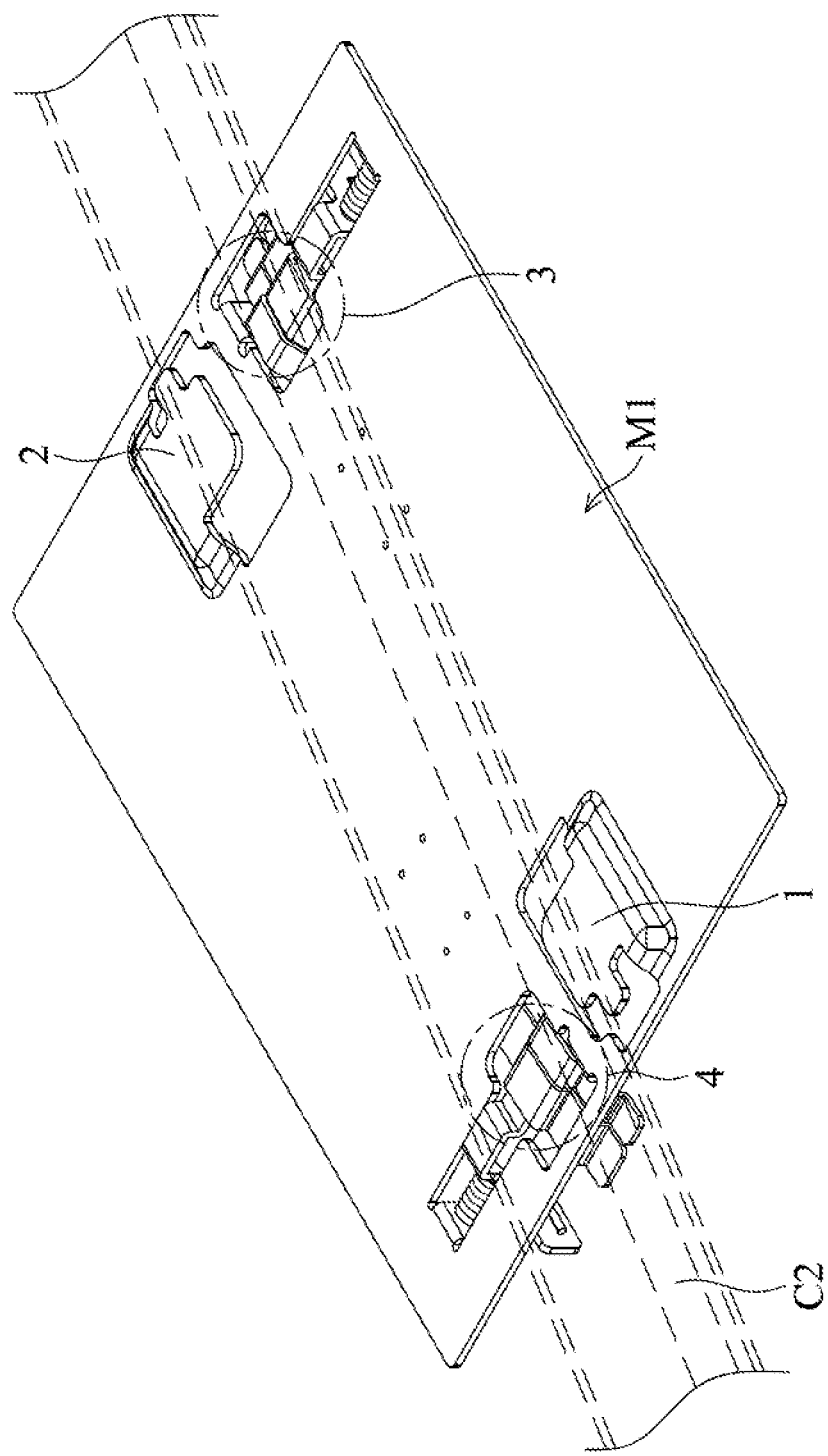
FIG. 4A shows a second state of assembly of the suspension mounting mechanism of the first embodiment of the invention.
Figure 4B:
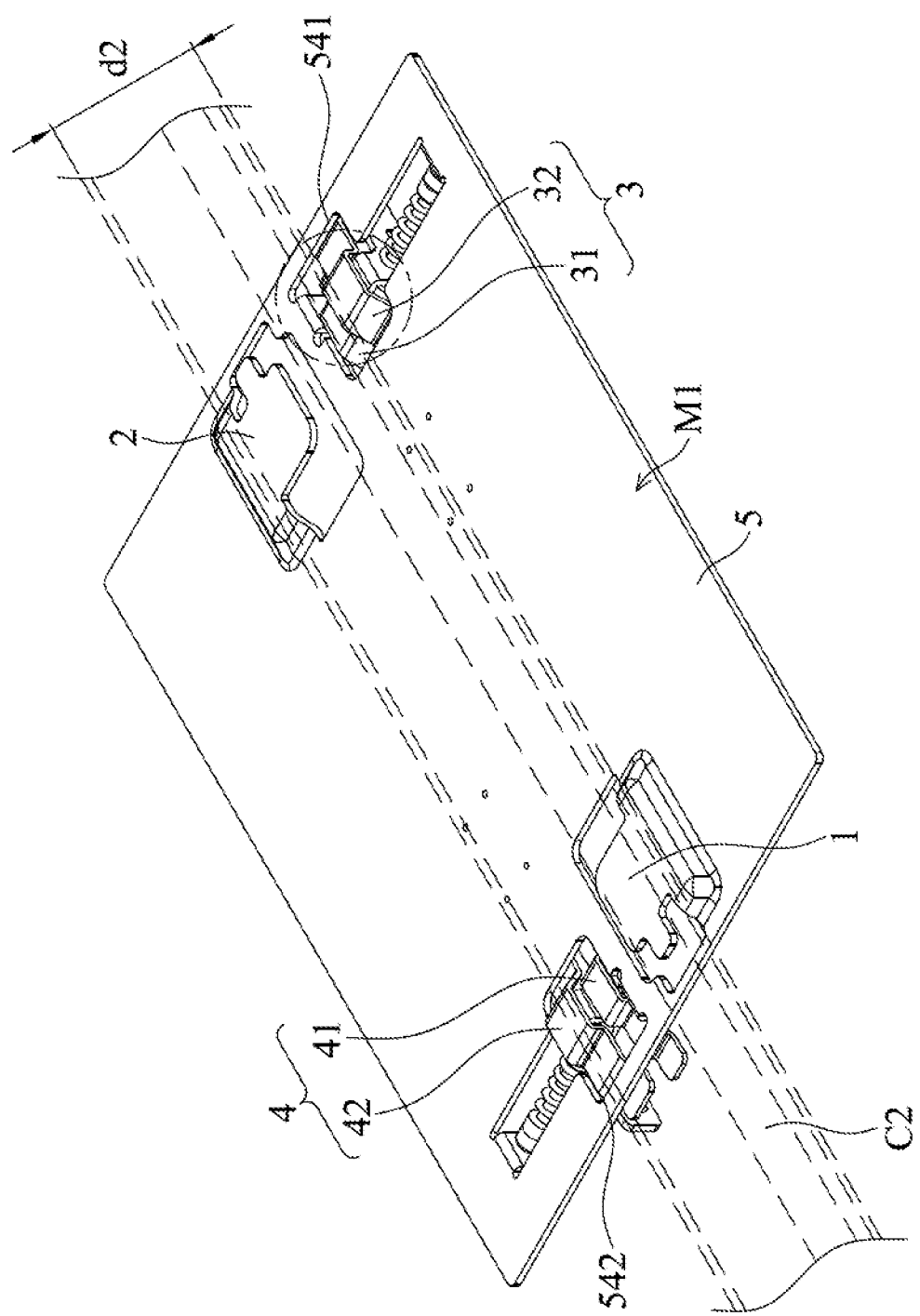
FIG. 4B shows a second mounting state of the suspension mounting mechanism of the first embodiment of the invention.

FIG. 4A shows a second state of assembly of the suspension mounting mechanism of the first embodiment of the invention. FIG. 4B shows a second mounting state of the suspension mounting mechanism of the first embodiment of the invention. With reference to FIGS. 2, 3A, 3B, 4A, in one embodiment, the suspension mounting mechanism M1 is adapted to mount the electronic device on a second ceiling structure C2. The first stopping unit 3 comprises a first elastic sheet 31 and a second elastic sheet 32. The second stopping unit 4 comprises a third elastic sheet 41 and a fourth elastic sheet 42. In the first mounting state (FIG. 3B), the first holding hook 1 and the first elastic sheet 31 abut one side of the first ceiling structure C1, and the second holding hook 2 and the third elastic sheet 41 abut the other side (the opposite side) of the first ceiling structure C1. In the second state of assembly (FIG. 4A), the second ceiling structure C2 presses and moves the first stopping unit 3 and the second stopping unit 4. In a second mounting state (FIG. 4B), the first holding hook 1 and the second elastic sheet 32 abut one side of the second ceiling structure C2, the second holding hook 2 and the fourth elastic sheet 42 abut the other side (the opposite side) of the second ceiling structure C2, and the bottom surface of the second ceiling structure C2 presses the first elastic sheet 31 and the third elastic sheet 41 at the same time. In this embodiment, the first ceiling structure C1 has a first structural width d1, the second ceiling structure C2 has a second structural width d2, and the second structural width d2 is wider than the first structural width d1.

With reference to FIGS. 2, 3B and 4B, in one embodiment, the suspension bracket 5 comprises a first bracket opening 541 and a second bracket opening 542. The first elastic sheet 31 and the second elastic sheet 32 are adapted to pass through the first bracket opening 541, and protrude from an upper surface of the suspension bracket 5 to contact the ceiling structure. The third elastic sheet 41 and the fourth elastic sheet 42 are adapted to pass through the second bracket opening 542, and protrude from the upper surface of the suspension bracket 5 to contact the ceiling structure. With reference to FIG. 2, particularly, for example, the first elastic sheet 31 comprises an elastic sheet abutting portion 311 and an elastic sheet extending portion 312. The elastic sheet abutting portion 311 passes through the first bracket opening 541, and protrudes from the upper surface of the suspension bracket 5 to contact the ceiling structure. The elastic sheet extending portion 312 allows the user to press the first elastic sheet 31. The structures of the second elastic sheet 32, the third elastic sheet 41 and the fourth elastic sheet 42 are similar to the first elastic sheet 31, and the related description is omitted.

Figure 5A:
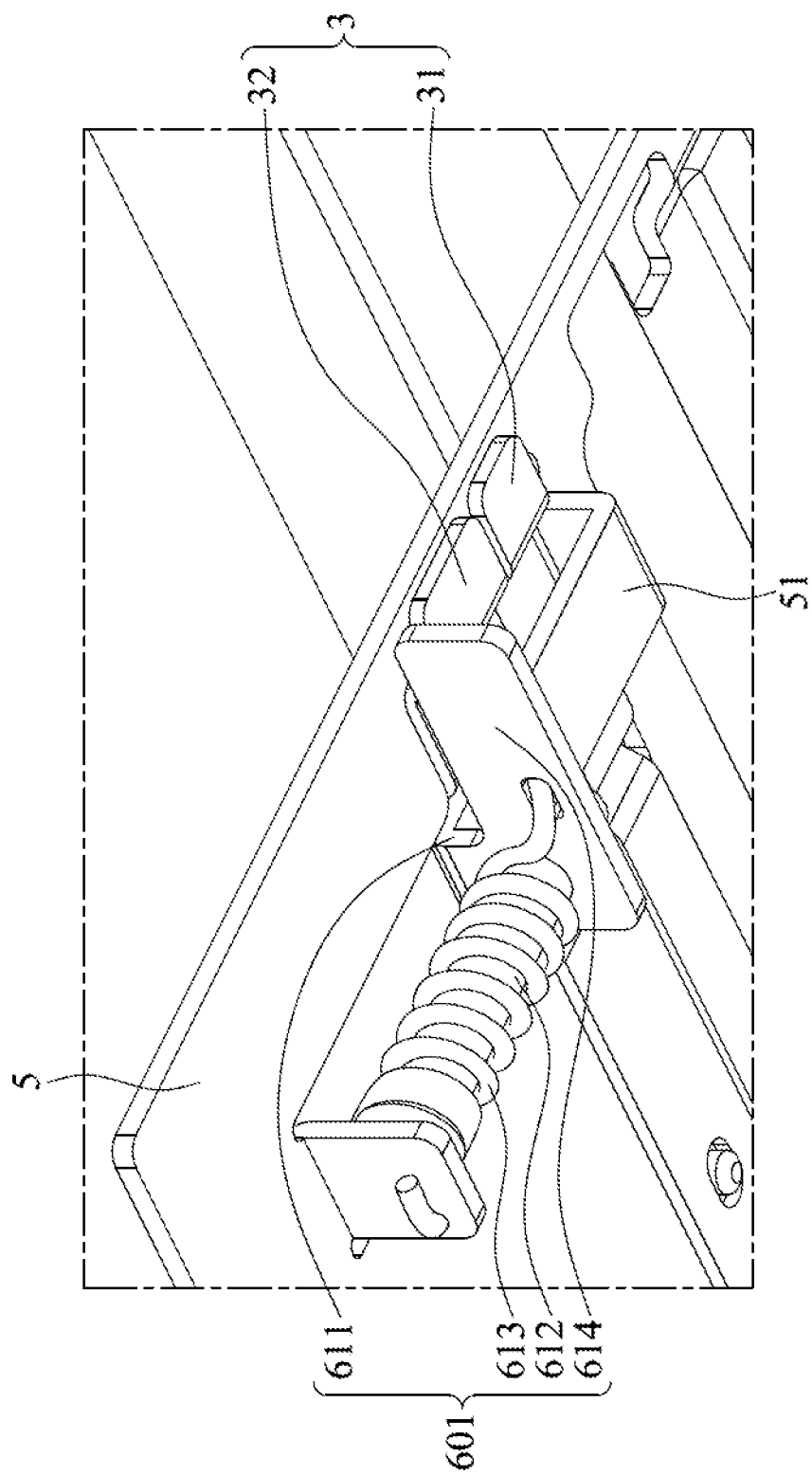
FIGS. 5A and 5B show the details of a locking unit of the first embodiment of the invention.
Figure 5B:
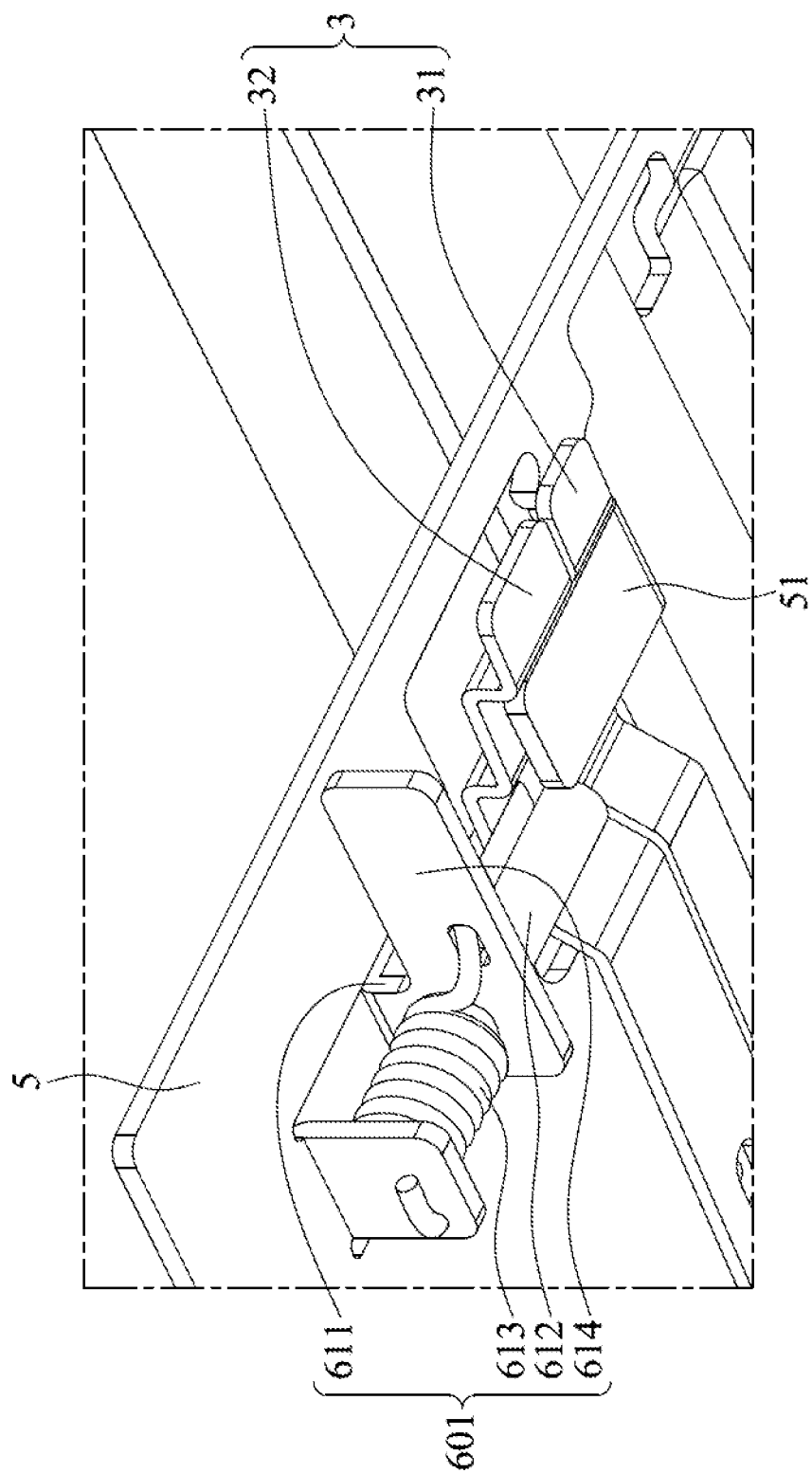
Figure 5C:
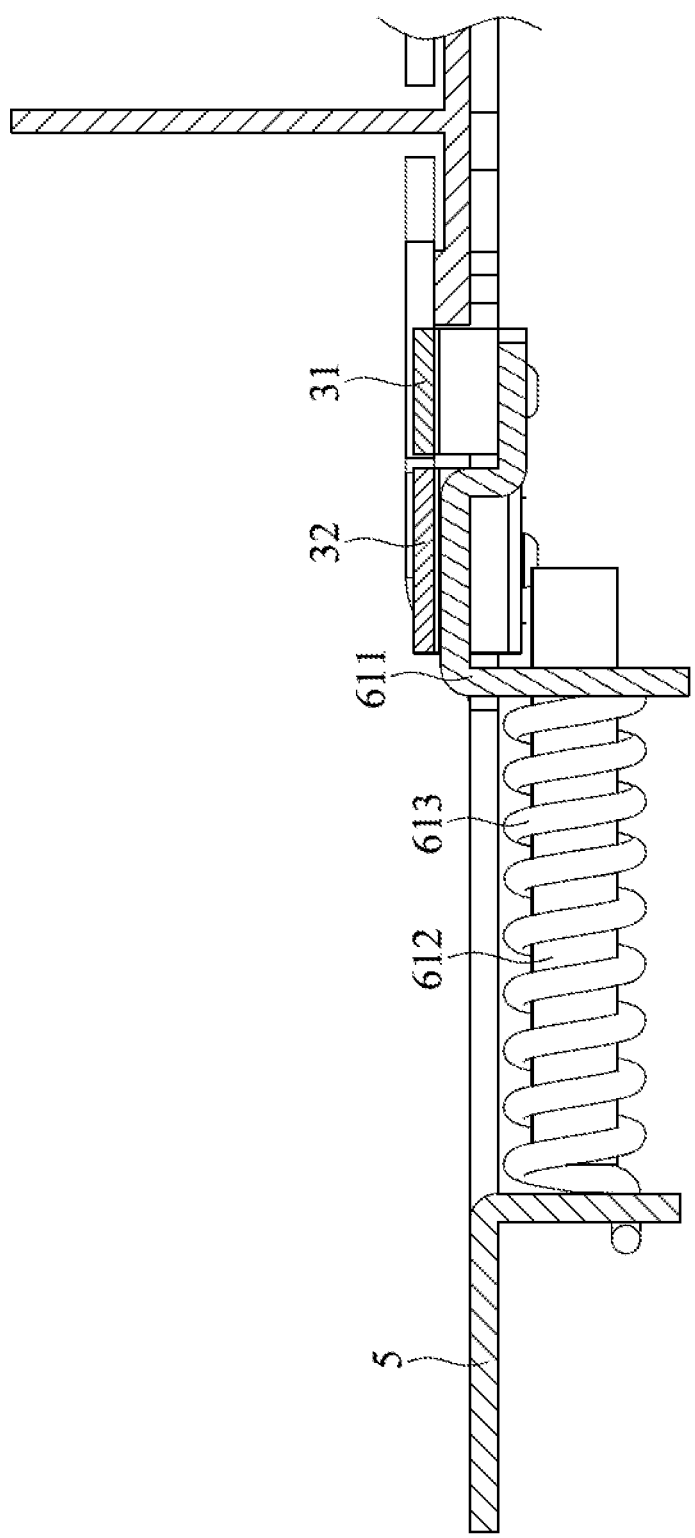
FIG. 5C is a cross sectional view of the locking unit of the first embodiment of the invention.

FIGS. 5A and 5B show the details of a locking unit of the first embodiment of the invention. FIG. 5C is a cross sectional view of the locking unit of the first embodiment of the invention. With reference to FIGS. 5A, 5B and 5C, in one embodiment, the suspension mounting mechanism M1 further comprises the locking unit 601. The locking unit 601 comprises a locking block 611. The locking block 611 is moved between a first block position (FIG. 5A) and a second block position (FIG. 5B). In a locked state (FIG. 5A), the locking block 611 is in the first block position and corresponds to the first stopping unit 3 to restrict the first stopping unit 3 from being moved relative to the suspension bracket 5 (in this embodiment, the first stopping unit 3 is restricted from being rotated downward). In an unlocked state (FIG. 5B), the locking block 611 is moved to the second block position to remove the restriction of the first stopping unit 3.

In the embodiment of the invention, the locking unit locks the stopping unit, and the stopping unit can sufficiently restrict the ceiling structure. The suspension mounting mechanism can be prevented from being unexpectedly separated from the ceiling structure. In one embodiment, there is another locking unit disposed corresponding to the second stopping unit. The description is omitted.

With reference to FIGS. 5A, 5B and 5C, in this embodiment, the locking unit 601 comprises a post 612 and an elastic element 613. The elastic element 613 is telescoped on the post 612. The locking block 611 is slidably connected to the post 612. The post 612 is disposed on the suspension bracket 5. One end of the elastic element 613 abuts the suspension bracket 5, and the other end of the elastic element 613 abuts the locking block 611.

With reference to FIGS. 5A, 5B and 5C, in one embodiment, the locking block 611 comprises a picking portion 614. The picking portion 614 is adapted to be pushed to move the locking block 611 from the first block position (FIG. 5A) to the second block position (FIG. 5B). The elastic element 613 is adapted to exert an elastic force on the locking block 611. The elastic force tends to move the locking block 611 from the second block position back to the first block position. In this embodiment, the user can manually pushes the picking portion 614 to unlock the locking block 611.

Figure 5D:
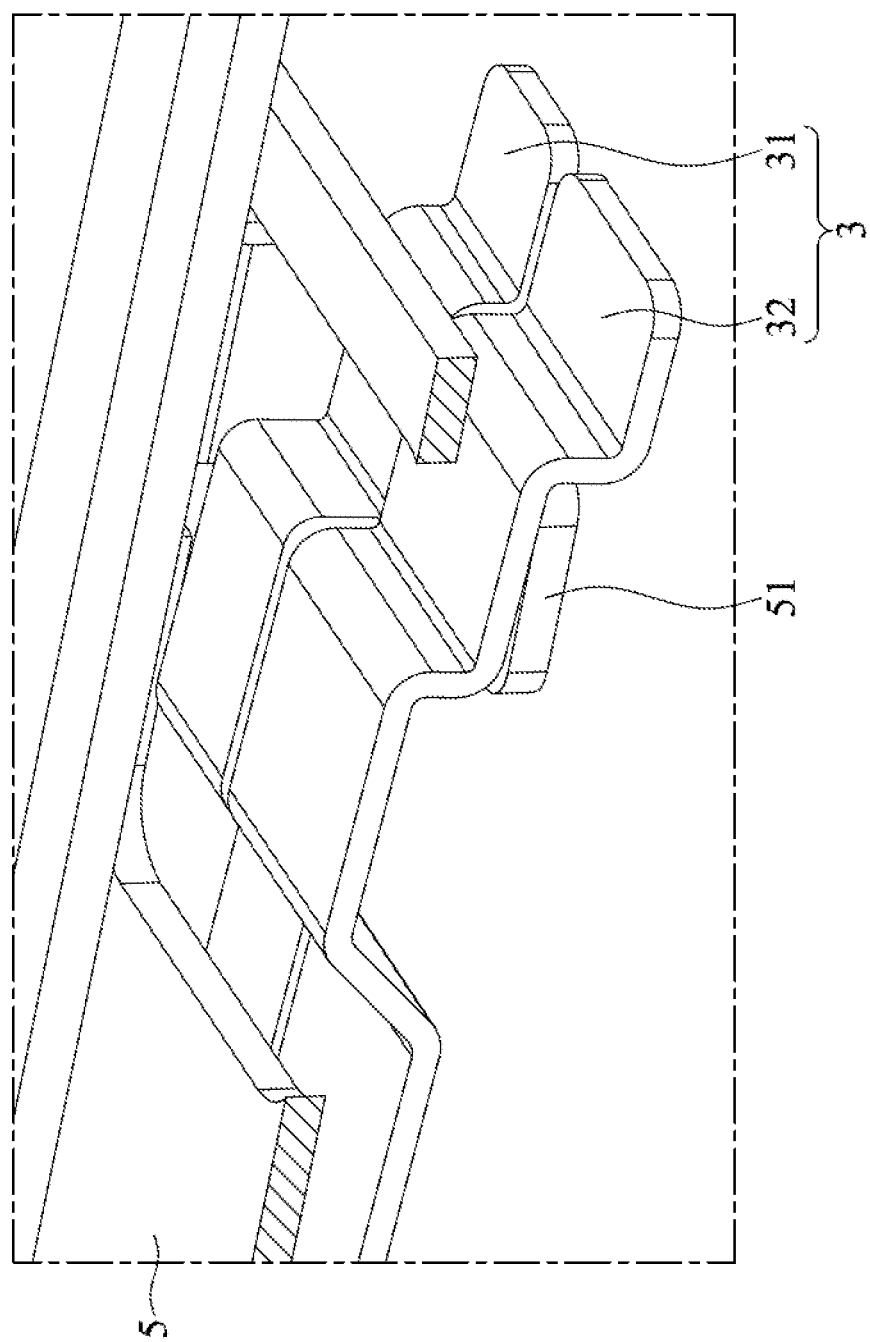
FIG. 5D shows a bracket restriction portion of the embodiment of the invention.

FIG. 5D shows a bracket restriction portion of the embodiment of the invention. With reference to FIGS. 5A, 5B and 5D, in one embodiment, the suspension bracket 5 further comprises a bracket restriction portion 51. The bracket restriction portion 51 corresponds to the first stopping unit 3 to prevent the first stopping unit 3 from being excessively deformed (In this embodiment, the bracket restriction portion 51 prevent the first stopping unit 3 from downward excessive-deformation).

Figure 6A:
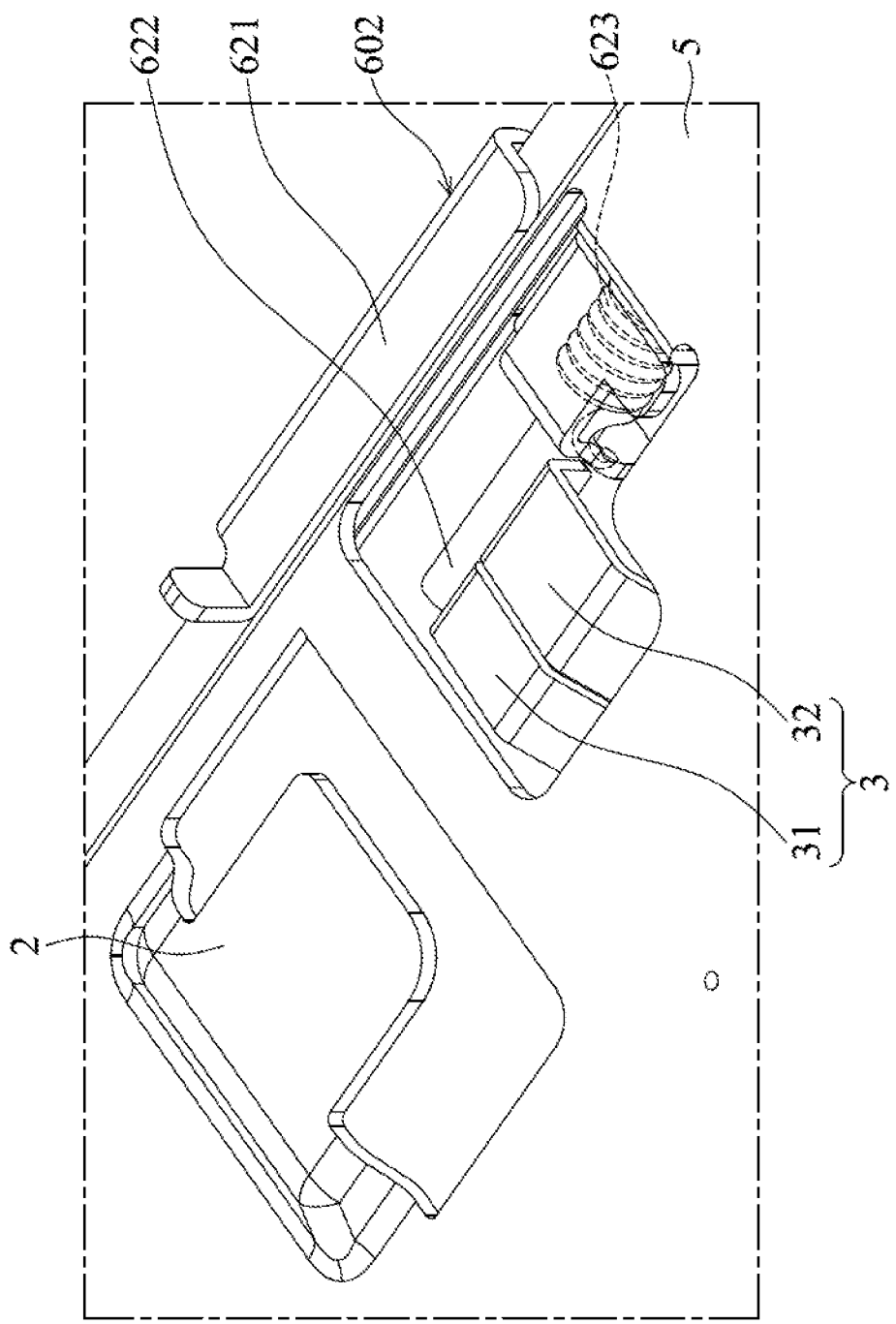
FIGS. 6A and 6B show the details of a locking unit of a second embodiment of the invention.
Figure 6B:
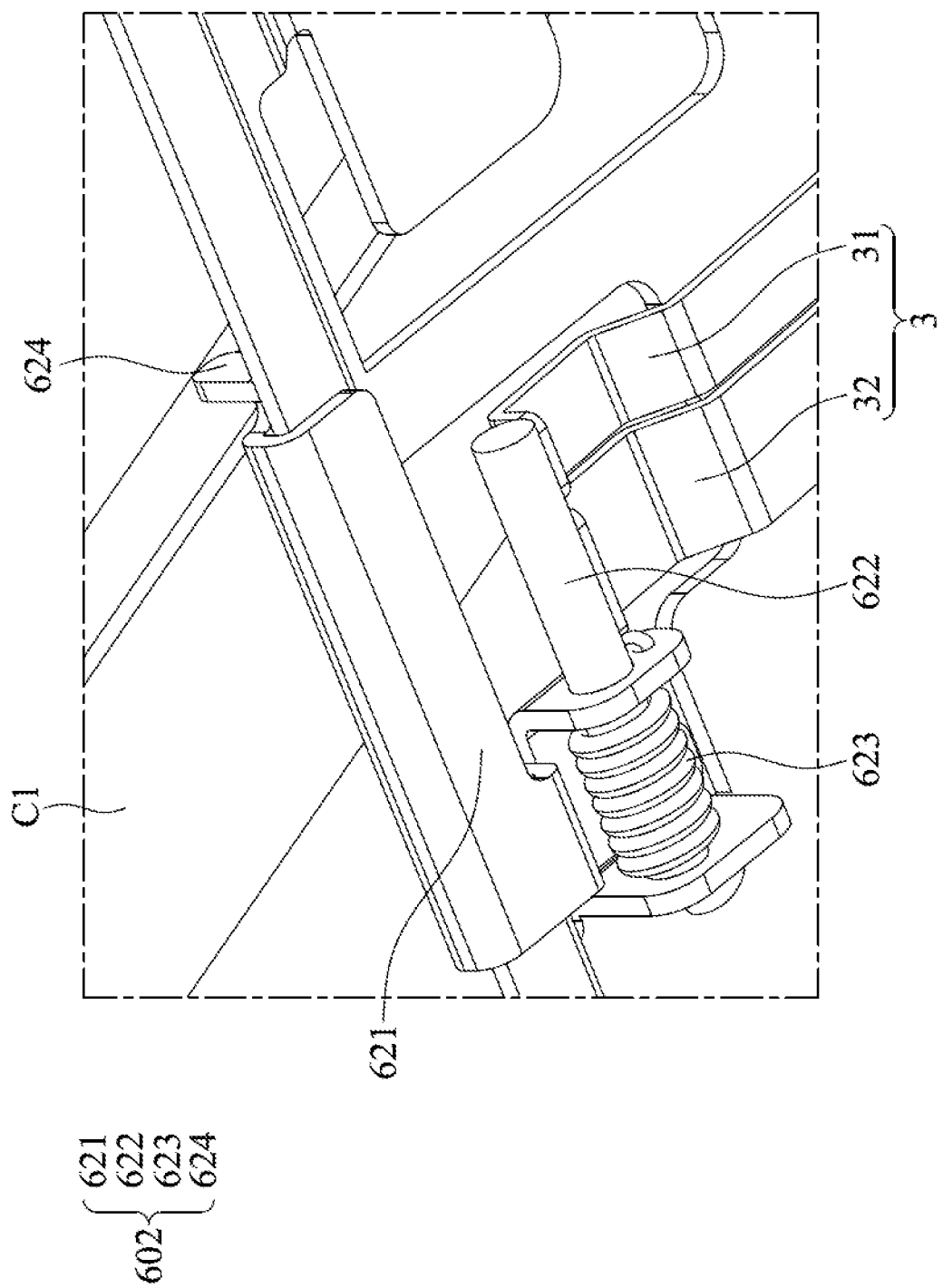
Figure 6C:
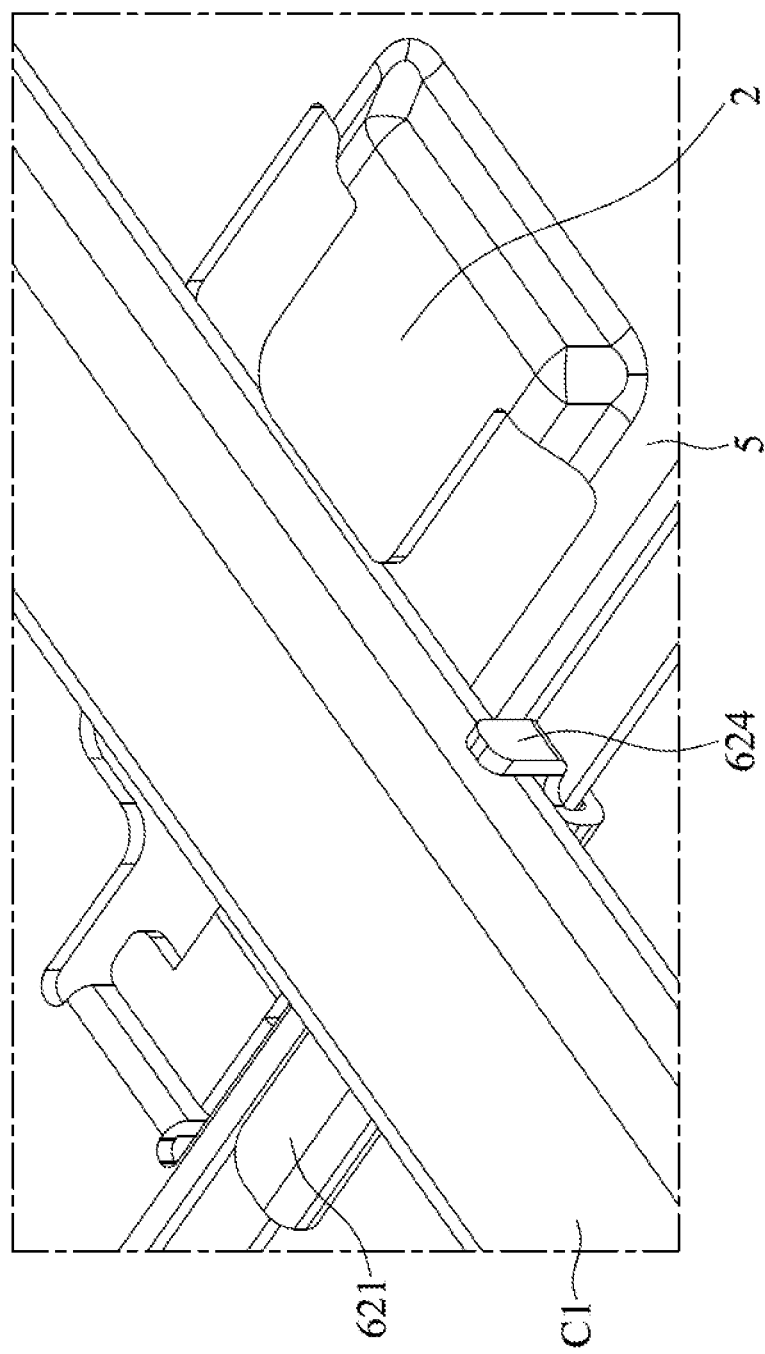
FIGS. 6C and 6D show the operation of the locking unit of the second embodiment of the invention.
Figure 6D:
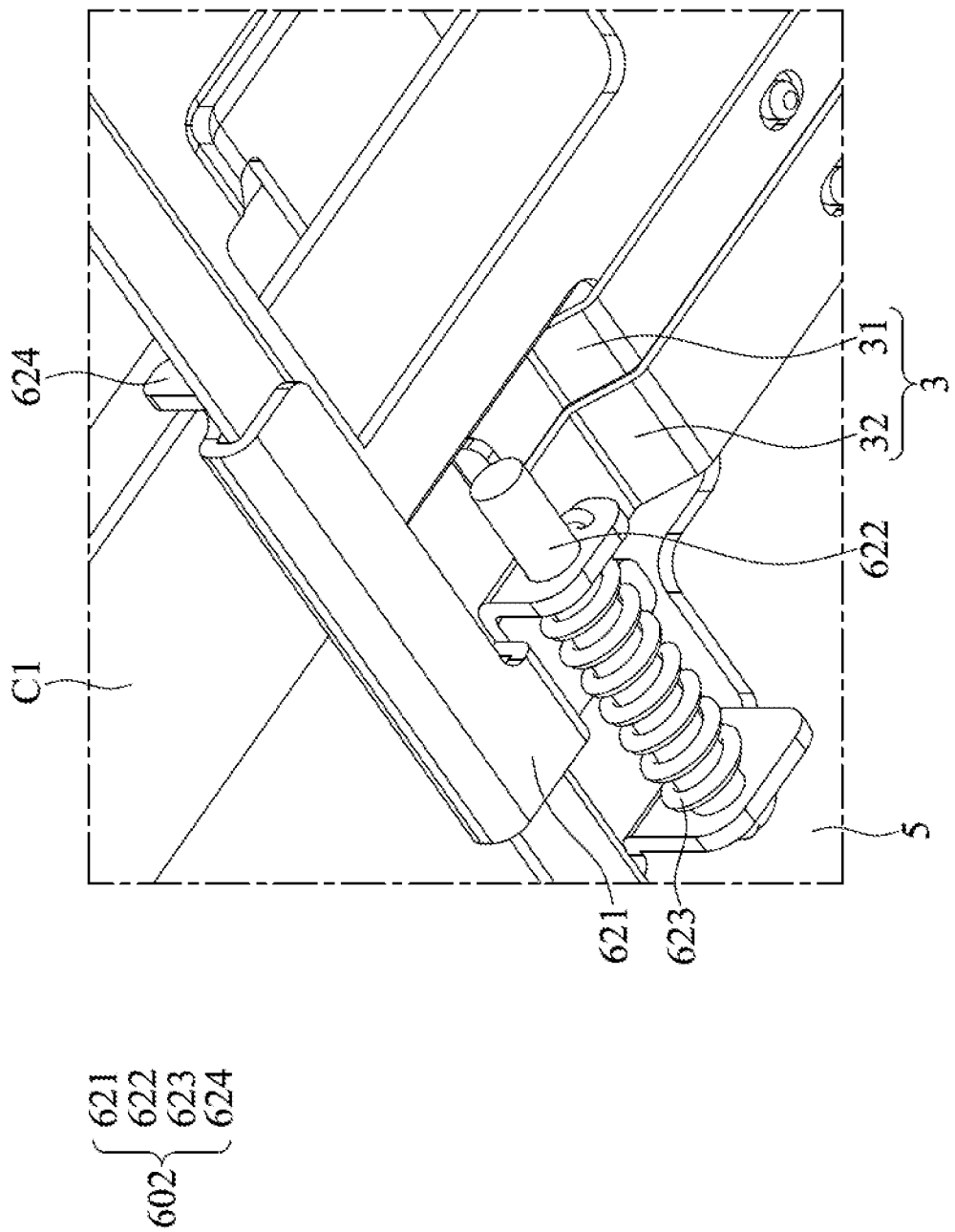

FIGS. 6A and 6B show the details of a locking unit of a second embodiment of the invention. FIGS. 6C and 6D show the operation of the locking unit of the second embodiment of the invention. With reference to FIGS. 6A, 6B, 6C and 6D, in this embodiment, the locking unit 602 comprises a post 622 and an elastic element 623. The elastic element 623 is telescoped on the post 622. The locking block 621 is slidably connected to the post 622. The post 622 is disposed on the suspension bracket 5. One end of the elastic element 623 abuts the suspension bracket 5, and the other end of the elastic element 623 abuts the locking block 621. In this embodiment, the locking block 621 comprises a picking portion 624. The picking portion 624 is adapted to be pushed to move the locking block 621 from the second block position to the first block position. The elastic element 623 is adapted to exert an elastic force on the locking block, and the elastic force tends to move the locking block 621 from the first block position back to the second block position.

With reference to FIGS. 6A, 6B, 6C and 6D, in one embodiment, in the first state of assembly, the first ceiling structure C1 pushes the picking portion 624 to move the locking block 621 from the second block position to the first block position. Therefore, in the assembling process, the locking unit 602 is located automatically. When the user desired to unlock the locking unit 602, the picking portion 624 is pressed to be separated from the ceiling structure, and the locking unit 602 is unlocked.

Figure 7A:
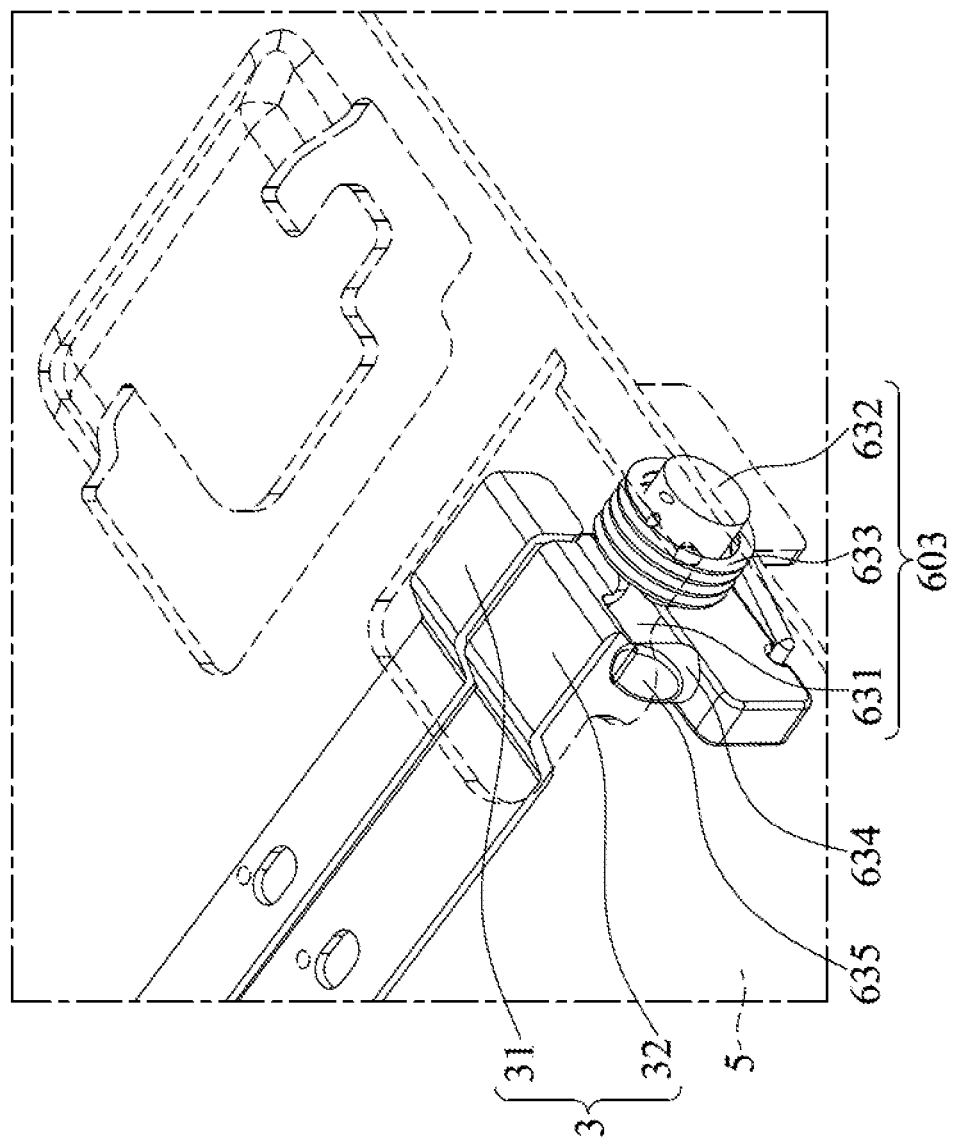
FIGS. 7A and 7B show the details of a locking unit of a third embodiment of the invention.
Figure 7B:
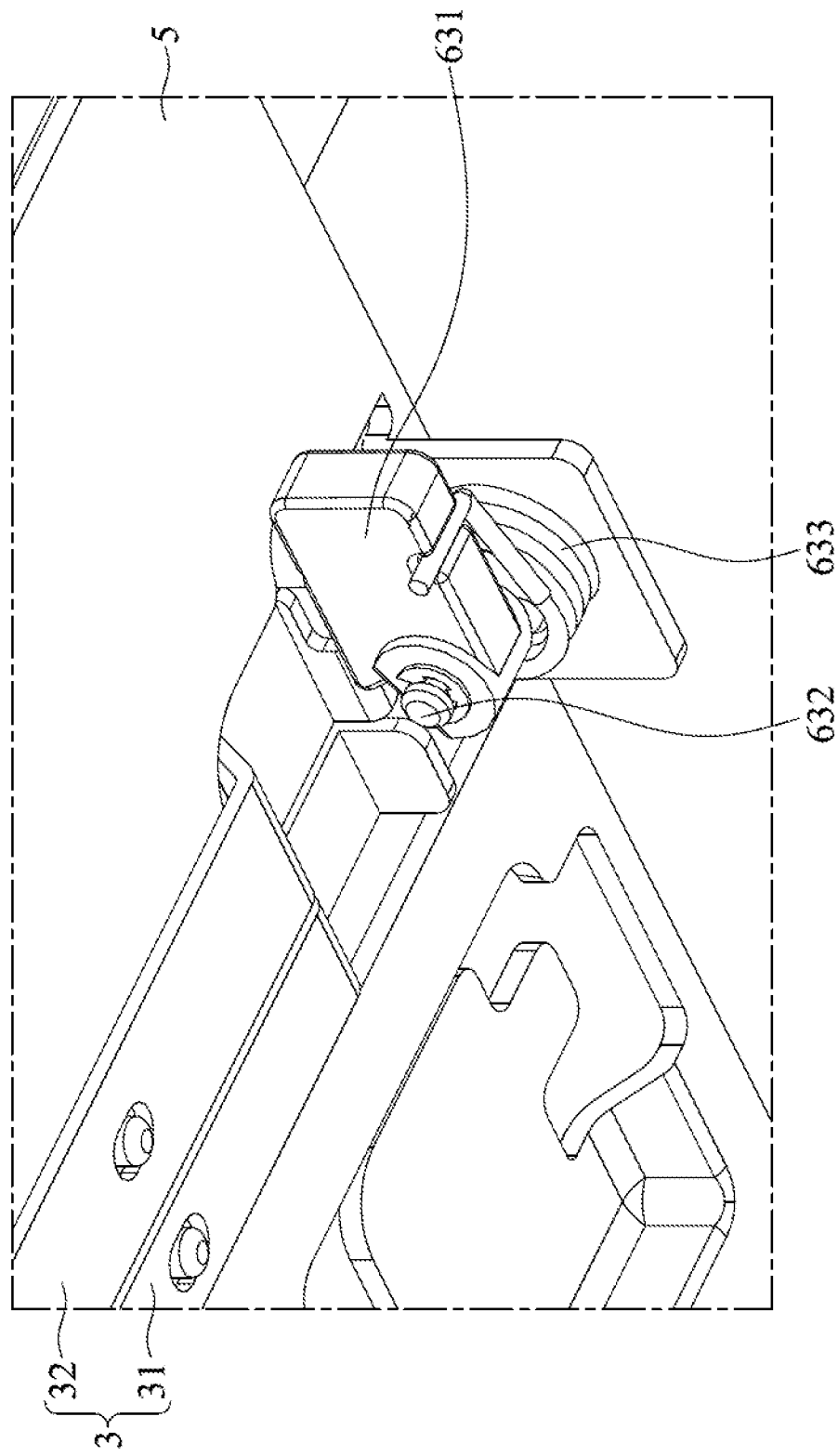
Figure 7C:
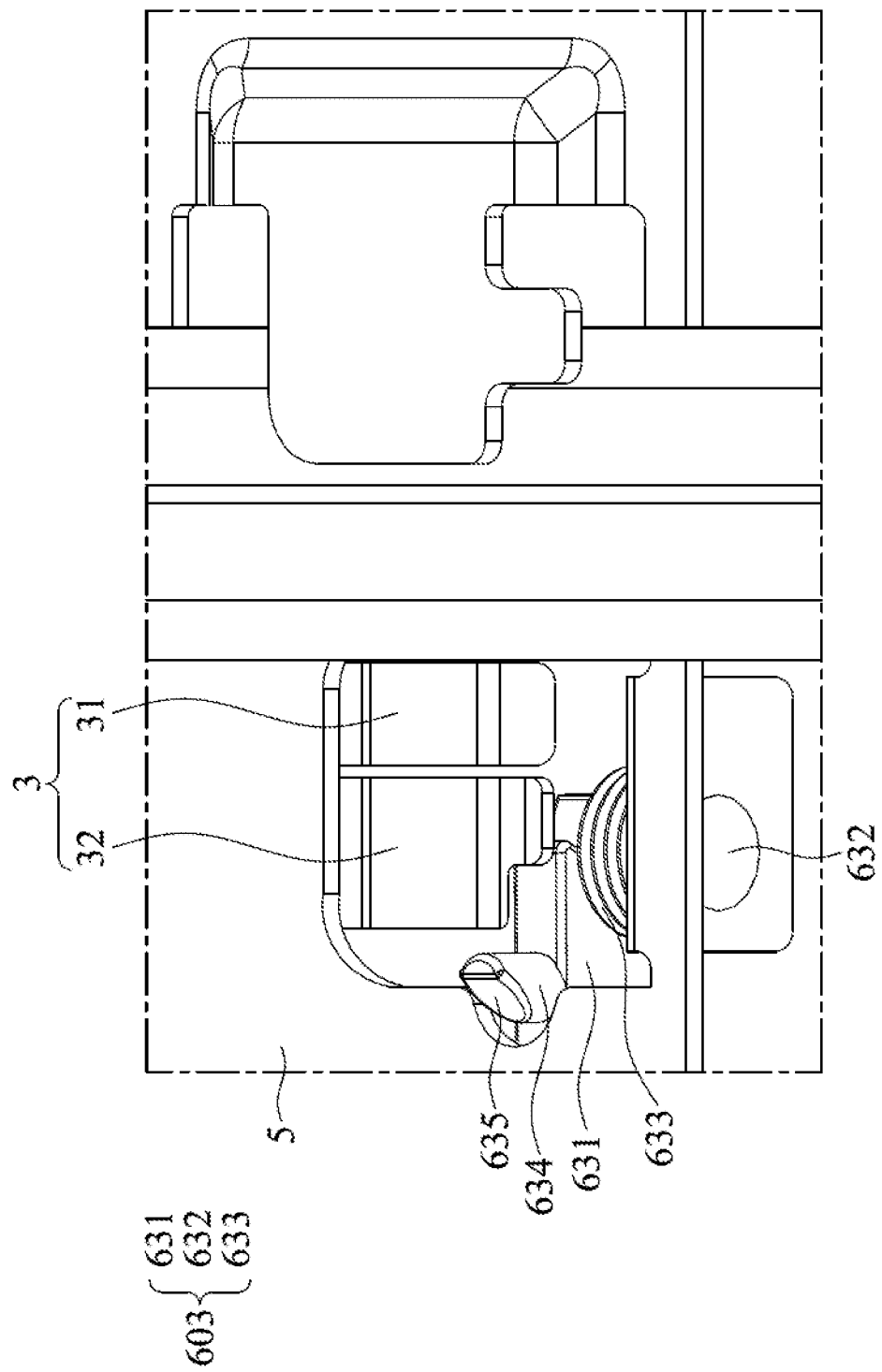
FIGS. 7C and 7D show the operation of the locking unit of the third embodiment of the invention.
Figure 7D:
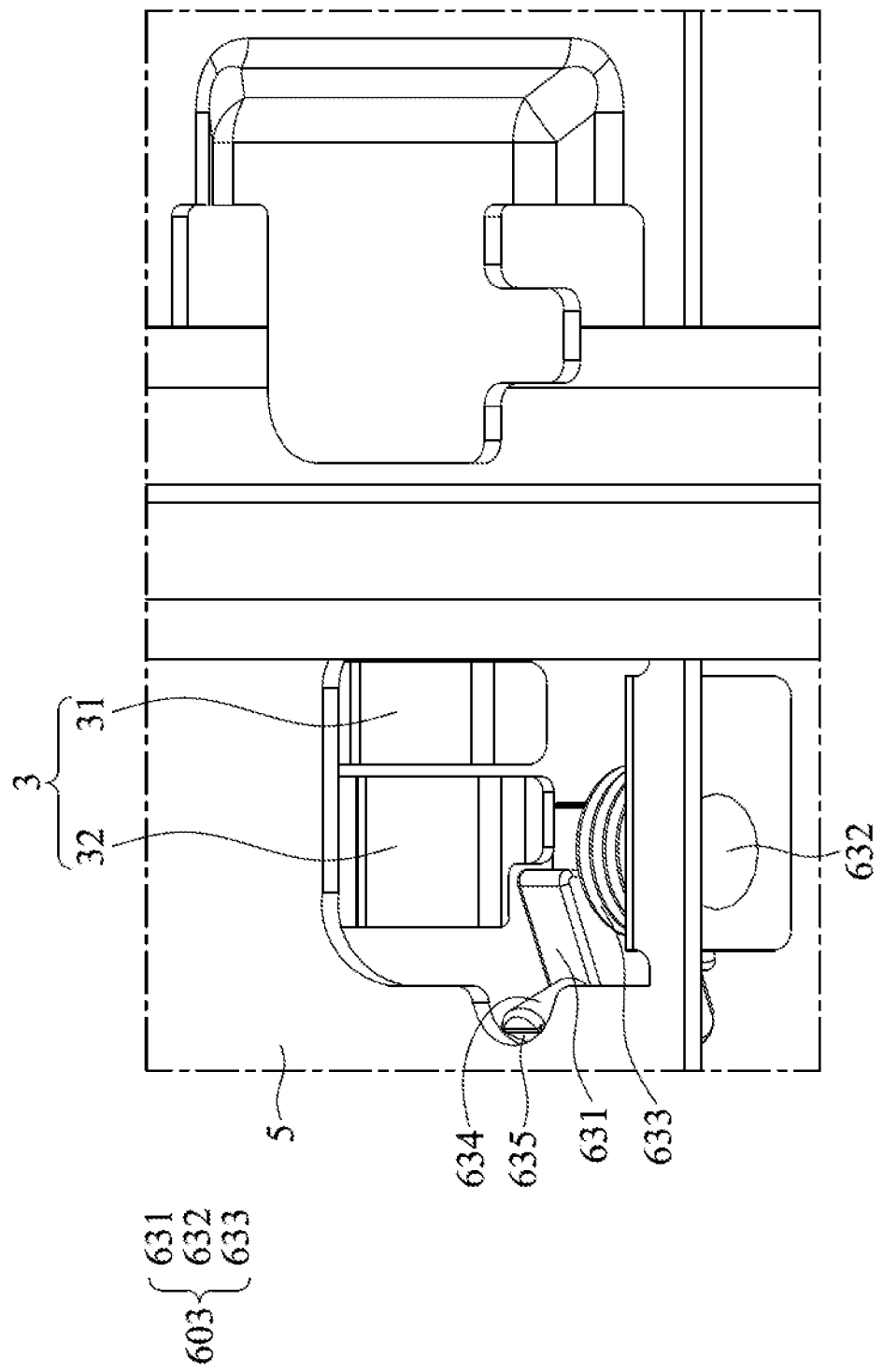

FIGS. 7A and 7B show the details of a locking unit of a third embodiment of the invention. FIGS. 7C and 7D show the operation of the locking unit of the third embodiment of the invention. With reference to FIGS. 7A, 7B, 7C and 7D, in one embodiment, the locking unit 603 comprises a shaft 632 and an elastic element 633. The elastic element 633 is telescoped on the shaft 632. The locking block 631 pivots on the shaft 632. The shaft 632 is disposed on the suspension bracket 5. One end of the elastic element 633 is connected to the suspension bracket 5. The other end of the elastic element 633 is connected to the locking block 631. The locking block 631 is adapted to rotate between the first block position (FIG. 7C) and the second block position (FIG. 7D).

With reference to FIGS. 7A, 7B, 7C and 7D, in one embodiment, the locking block 631 comprises a block pillar 634. The block pillar 634 is adapted to be pressed to rotate the locking block 631 from the first block position (FIG. 7C) to the second block position (FIG. 7D). By pressing the block pillar 634, the locking unit 603 is unlocked.

With reference to FIGS. 7A, 7B, 7C and 7D, in one embodiment, the block pillar 634 comprises a pillar inclined surface 635. In the first state of assembly, the first ceiling structure C1 presses the block pillar 634 along the pillar inclined surface 635 to rotate the locking block 631 from the first block position (FIG. 7C) to the second block position (FIG. 7D). Therefore, the suspension mounting mechanism can be assembled to the ceiling structure. After the suspension mounting mechanism is assembled to the ceiling structure, the locking block 631 is rotated back to the first block position (FIG. 7C) by the elastic force of the elastic element 633, and the locking block 631 restrict the rotation of the second elastic sheet 32.

Figure 8A:
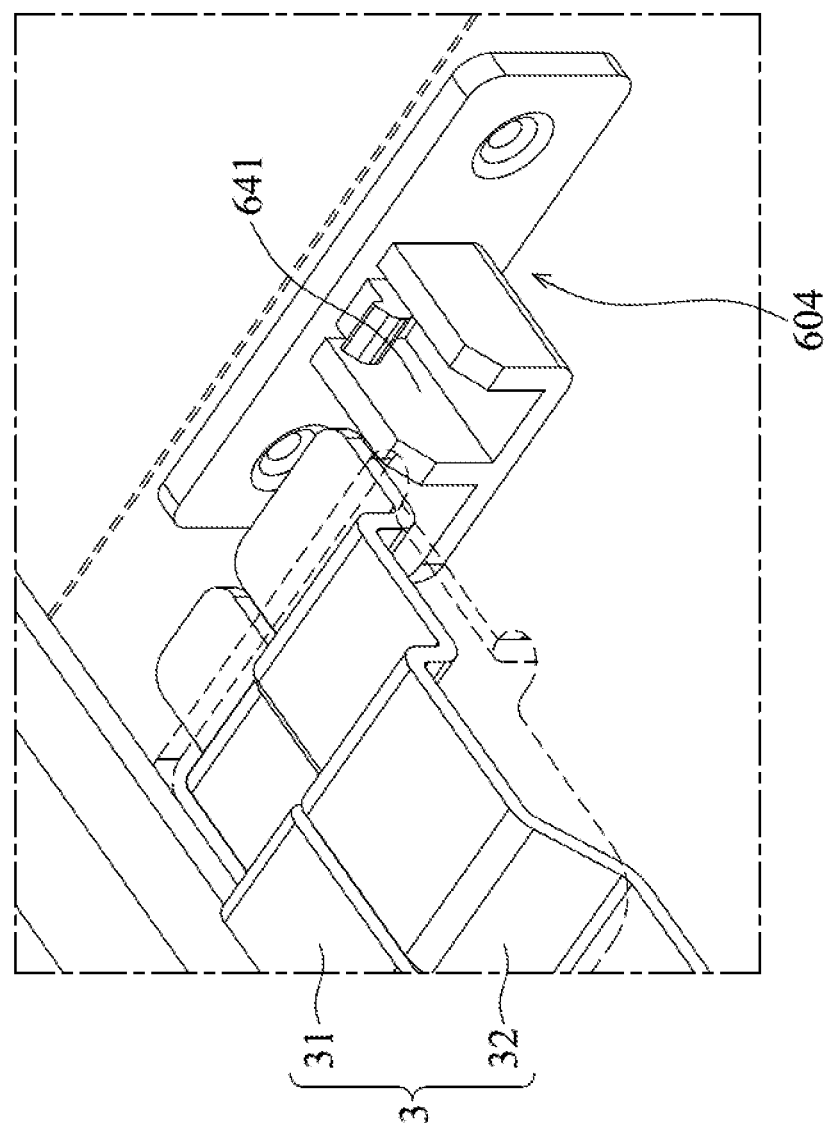
FIG. 8A shows the details of a locking unit of a fourth embodiment of the invention.
Figure 8B:
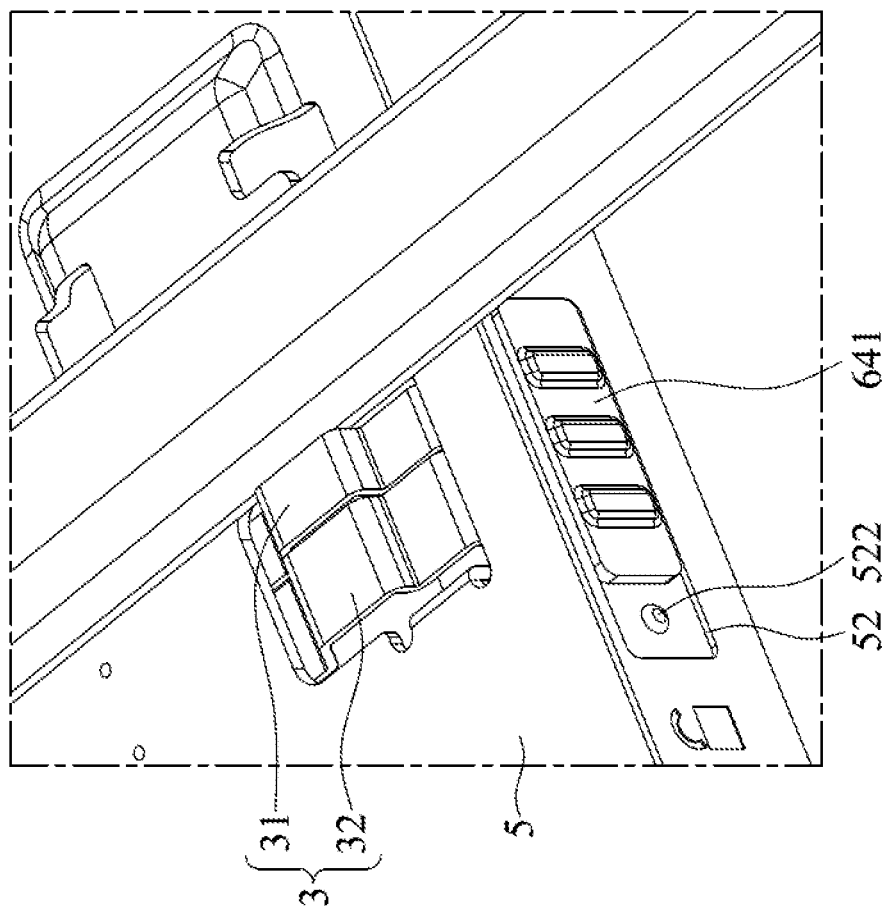
FIGS. 8B and 8C show the operation of the locking unit of the fourth embodiment of the invention.
Figure 8C:
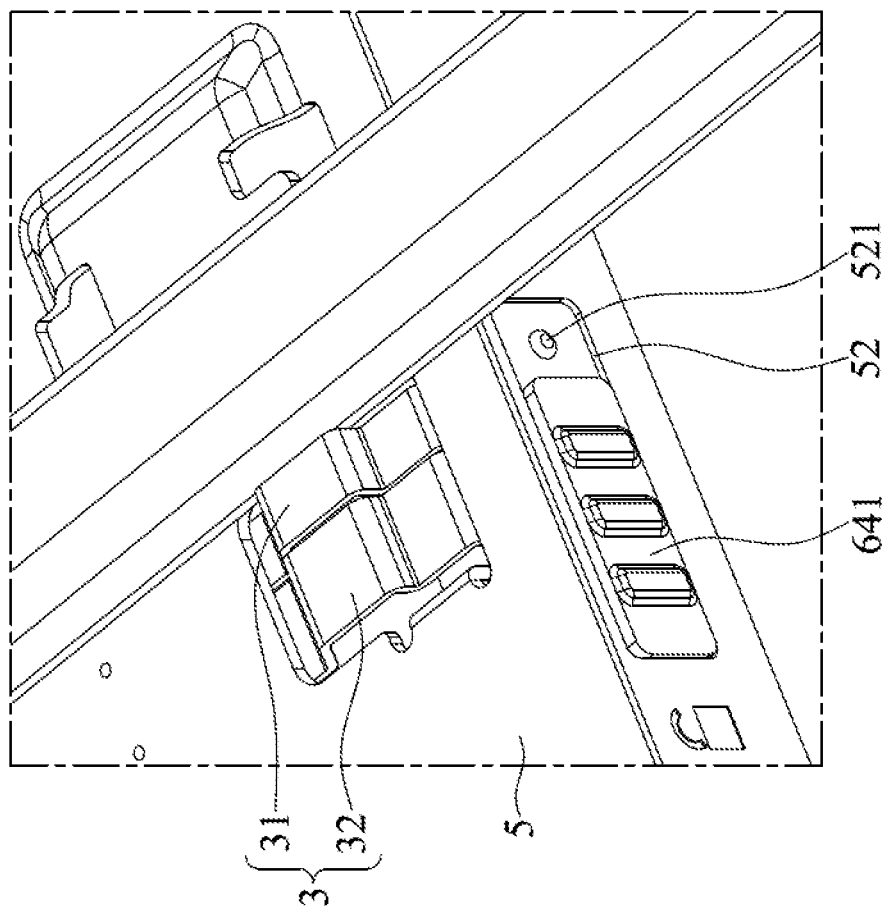
Figure 8D:
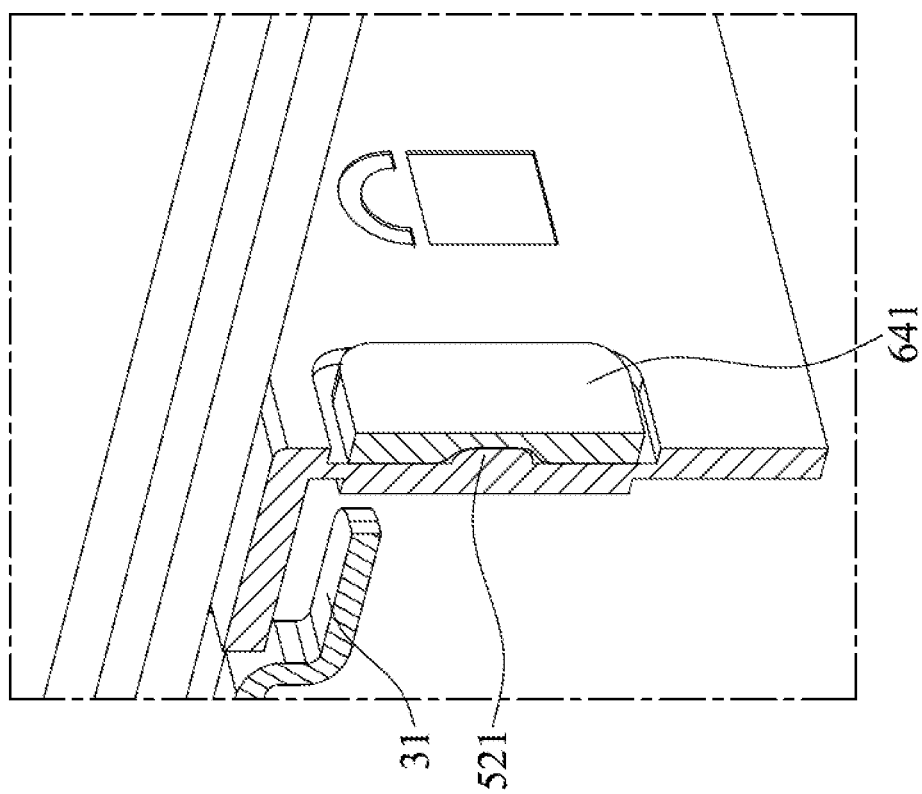
FIG. 8D is a cross sectional view of the locking unit of the fourth embodiment of the invention.

FIG. 8A shows the details of a locking unit of a fourth embodiment of the invention. FIGS. 8B and 8C show the operation of the locking unit of the fourth embodiment of the invention. FIG. 8D is a cross sectional view of the locking unit of the fourth embodiment of the invention. With reference to FIGS. 8A, 8B, 8C and 8D, in one embodiment, the locking unit 604 comprises a locking block 641. The suspension bracket 5 comprises a slot 52. The locking block 641 is adapted to slide in the slot 52. The locking block 641 is moved between the first block position (FIG. 8B) and the second block position (FIG. 8C). In one embodiment, the suspension bracket 5 further comprises a first protrusion 521 and a second protrusion 522. When the locking block 641 is in the first block position, the first protrusion 521 is wedged into the locking block 641 (FIG. 8D). When the locking block 641 is in the second block position, the second protrusion 522 is wedged into the locking block 641. In this embodiment, the user can move the locking block 641 to perform the locking and unlocking operation. With reference to FIG. 8A, in one embodiment, in the locked state, the locking block 641 is below the second elastic sheet 32 to restrict the rotation of the second elastic sheet 32.

Figure 9A:
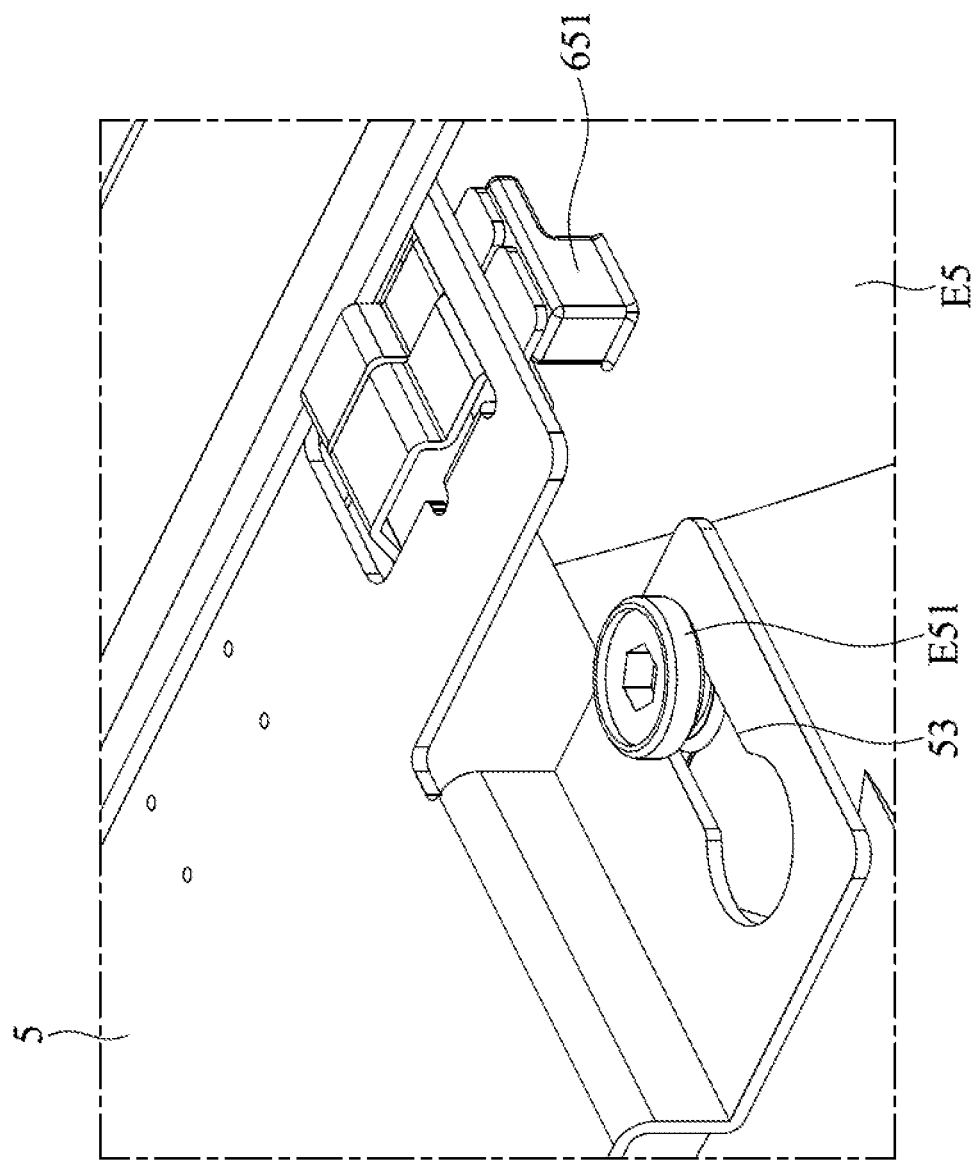
FIGS. 9A and 9B show the operation of a locking unit of the fifth embodiment of the invention.
Figure 9B:
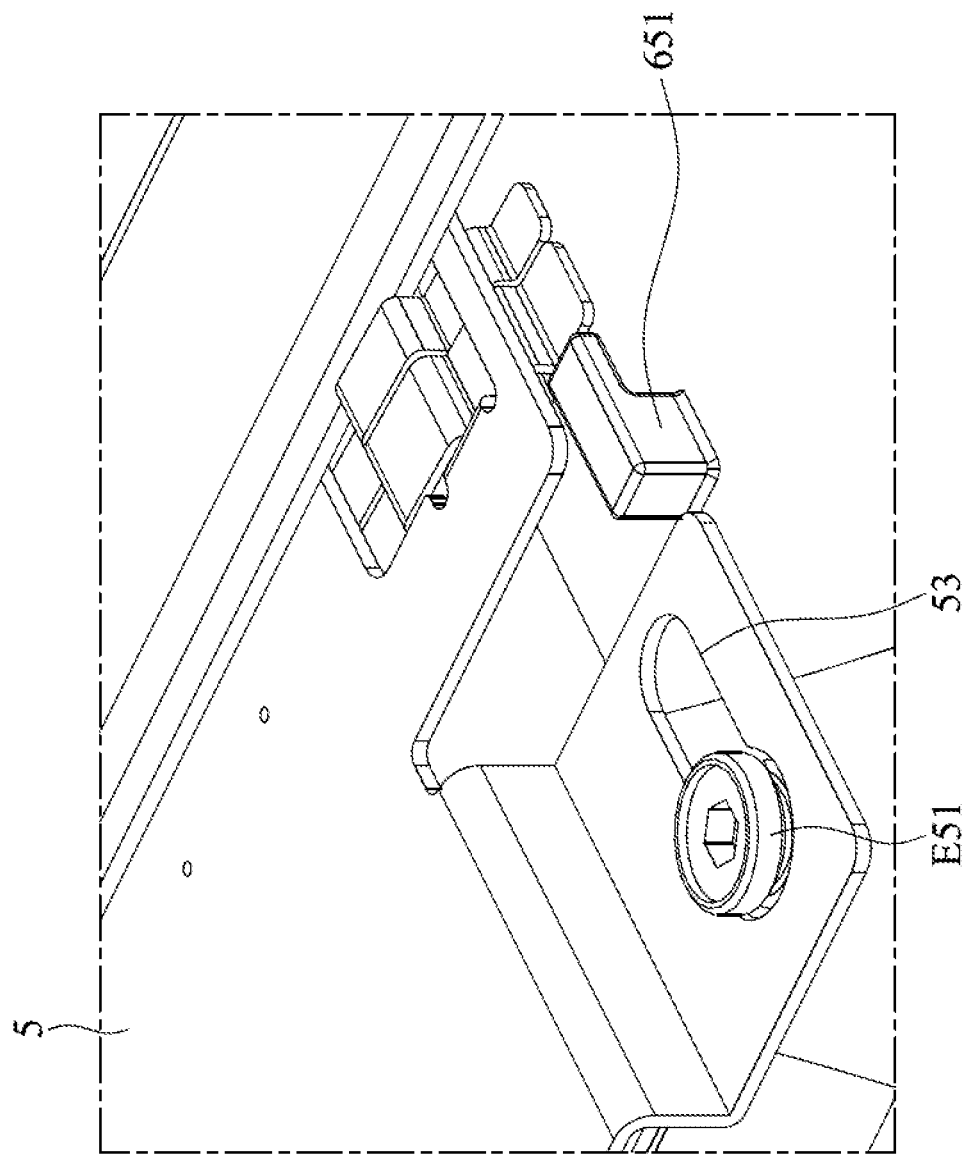

FIGS. 9A and 9B show the operation of a locking unit of the fifth embodiment of the invention. With reference to FIGS. 9A and 9B, in one embodiment, the locking block 651 is disposed on an electronic device E5. The electronic device E5 is moveable between a first device position (FIG. 9A) and a second device position (FIG. 9B) relative to the suspension bracket 5. When the electronic device E5 is in the first device position (FIG. 9A), the electronic device E5 is connected to the suspension bracket 5, and the locking block 651 is in the first block position. When the electronic device E5 is in the second device position (FIG. 9B), the electronic device E5 is adapted to be separated from the suspension bracket 5, and the locking block 651 is in the second block position. With reference to FIGS. 9A and 9B, in this embodiment, the suspension bracket 5 comprises a connection slot 53. The electronic device E5 includes a latch E51. The latch E51 is slidably connection to the connection slot 53.

The suspension mounting mechanism of the embodiment of the invention can be selectively connected to two ceiling structures of different sizes. The suspension mounting mechanism of the embodiment of the invention has a simpler structure and a lower cost, and it can easily be attached to a ceiling structure. Additionally, the suspension mounting mechanism of the embodiment of the invention has a locking unit, which prevents the suspension mounting mechanism from being unexpectedly separated from the ceiling structure.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A suspension mounting mechanism, adapted to be mounted on a first ceiling structure, comprising:
   a suspension bracket;
   a first holding hook, affixed to the suspension bracket;
   a second holding hook, affixed to the suspension bracket;
   a first stopping unit, moveably disposed on the suspension bracket;
   a second stopping unit, moveably disposed on the suspension bracket, wherein in a first state of assembly, the first ceiling structure presses and moves the first stopping unit and the second stopping unit, and in a first mounting state, the first holding hook and the first stopping unit abut one side of the first ceiling structure, and the second holding hook and the second stopping unit abut another side of the first ceiling structure; and
   a locking unit, wherein in a locked state, the locking unit restricts the movement of the first stopping unit relative to the suspension bracket, and in an unlocked state, the restriction of the locking unit toward the first stopping unit is removed,
   wherein the suspension mounting mechanism is adapted to be mounted on a second ceiling structure, the first stopping unit comprises a first elastic sheet and a second elastic sheet, the second stopping unit comprises a third elastic sheet and a fourth elastic sheet, in the first mounting state, the first holding hook and the first elastic sheet abut one side of the first ceiling structure, and the second holding hook and the third elastic sheet abut another side of the first ceiling structure, and in a second state of assembly, the second ceiling structure presses and moves the first stopping unit and the second stopping unit, and in a second mounting state, the first holding hook and the second elastic sheet abut one side of the second ceiling structure, the second holding hook and the fourth elastic sheet abut another side of the second ceiling structure, and a bottom surface of the second ceiling structure presses the first elastic sheet and the third elastic sheet at the same time, wherein the first ceiling structure has a first structural width, the second ceiling structure has a second structural width, and the second structure width is wider than the first structural width.

2. The suspension mounting mechanism as claimed in claim 1, wherein the locking unit comprises a locking block, the locking block is moved between a first block position and a second block position, and in the locked state, the locking block is in the first block position and corresponds to the first stopping unit to restrict the first stopping unit from being moved relative to the suspension bracket, and in the unlocked state, the locking block has moved to the second block position to remove the restriction of the first stopping unit.

3. The suspension mounting mechanism as claimed in claim 2, wherein the locking unit comprises a post and an elastic element, the elastic element is telescoped on the post, the locking block is slidably connected to the post, the post is disposed on the suspension bracket, one end of the elastic element abuts the suspension bracket, and the other end of the elastic element abuts the locking block.

4. The suspension mounting mechanism as claimed in claim 3, wherein the locking block comprises a picking portion, the picking portion is adapted to be pushed to move the locking block from the first block position to the second block position, the elastic element is adapted to exert an elastic force on the locking block, and the elastic force tends to move the locking block from the second block position back to the first block position.

5. The suspension mounting mechanism as claimed in claim 3, wherein the locking block comprises a picking portion, the picking portion is adapted to be pushed to move the locking block from the second block position to the first block position, the elastic element is adapted to exert an elastic force on the locking block, and the elastic force tends to move the locking block from the first block position back to the second block position.

6. The suspension mounting mechanism as claimed in claim 5, wherein in the first state of assembly, the first ceiling structure pushes the picking portion to move the locking block from the second block position to the first block position.

7. The suspension mounting mechanism as claimed in claim 2, wherein the locking unit comprises a shaft and an elastic element, the elastic element is telescoped on the shaft, the locking block pivots on the shaft, the shaft is disposed on the suspension bracket, one end of the elastic element is connected to the suspension bracket, the other end of the elastic element is connected to the locking block, and the locking block is adapted to rotate between the first block position and the second block position.

8. The suspension mounting mechanism as claimed in claim 7, wherein the locking block comprises a block pillar, the block pillar is adapted to be pressed to rotate the locking block from the first block position to the second block position.

9. The suspension mounting mechanism as claimed in claim 8, wherein the block pillar comprises a pillar inclined surface, and in the first state of assembly, the first ceiling structure presses the block pillar along the pillar inclined surface to rotate the locking block from the first block position to the second block position.

10. The suspension mounting mechanism as claimed in claim 2, wherein the suspension bracket comprises a slot, the locking block is adapted to slide in the slot, and the locking block is moved between the first block position and the second block position.

11. The suspension mounting mechanism as claimed in claim 10, wherein the suspension bracket further comprises a first protrusion and a second protrusion, and when the locking block is in the first block position, the first protrusion is wedged into the locking block, and when the locking block is in the second block position, the second protrusion is wedged into the locking block.

12. The suspension mounting mechanism as claimed in claim 2, wherein the locking block is disposed on an electronic device, the electronic device is moveable between a first device position and a second device position relative to the suspension bracket, and when the electronic device is in the first device position, the electronic device is connected to the suspension bracket, and the locking block is in the first block position, and when the electronic device is in the second device position, the electronic device is adapted to be separated from the suspension bracket, and the locking block is in the second block position.

13. The suspension mounting mechanism as claimed in claim 2, wherein the suspension bracket comprises a first bracket opening, and at least a portion of the first stopping unit passes through the first bracket opening and protrudes from a surface of the suspension bracket.

* * * * *